(12) United States Patent
Usuki et al.

(10) Patent No.: US 11,170,206 B2
(45) Date of Patent: Nov. 9, 2021

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventors: Masaya Usuki, Tokyo (JP); Yuto Tanaka, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 96 days.

(21) Appl. No.: 16/564,253

(22) Filed: Sep. 9, 2019

(65) Prior Publication Data

US 2020/0104576 A1 Apr. 2, 2020

(30) Foreign Application Priority Data

Sep. 28, 2018 (JP) .............................. JP2018-184842

(51) Int. Cl.
*G06K 9/00* (2006.01)
*G06K 9/62* (2006.01)

(52) U.S. Cl.
CPC ..... *G06K 9/00288* (2013.01); *G06K 9/00248* (2013.01); *G06K 9/00261* (2013.01); *G06K 9/6219* (2013.01); *G06K 2009/00328* (2013.01)

(58) Field of Classification Search
CPC .......... G06K 9/00288; G06K 9/00248; G06K 9/00261; G06K 9/6219; G06K 2009/00328
See application file for complete search history.

(56) References Cited

U.S. PATENT DOCUMENTS

| | | |
|---|---|---|
| 2010/0142762 A1 | 6/2010 | Morita |
| 2016/0019413 A1 | 1/2016 | Svendsen |
| 2017/0039453 A1 | 2/2017 | Mitsumoto et al. |

FOREIGN PATENT DOCUMENTS

| | | |
|---|---|---|
| JP | 4333481 B2 | 9/2009 |
| JP | 2010-140069 A | 6/2010 |

(Continued)

OTHER PUBLICATIONS

Naaman, "Leveraging Context to Resolve Identity in Photo Albums", JCDL 2005 (Year: 2005).*

(Continued)

*Primary Examiner* — Mark Roz
(74) *Attorney, Agent, or Firm* — Studebaker & Brackett PC

(57) ABSTRACT

Provided are an image processing device, an image processing method, a program, and a recording medium which are capable of classifying a plurality of persons appearing in an image set into groups.

In an image processing device, an image processing method, a program, and a recording medium according to an embodiment of the present invention, a plurality of persons appearing in an image set is determined. In a case where two or more persons among the plurality of persons appear in the image based on a determination result of the plurality of persons for each image included in the image set, co-occurrence relation information indicating that the two or more persons have a co-occurrence relation in the image is stored. A co-occurrence score indicating strength of the co-occurrence relation of two persons in the image set is calculated based on all the co-occurrence relation information items in the image for each permutation of the two persons of the plurality of persons. A part of the plurality of (Continued)

persons is classified into a group based on all the co-occurrence scores of the permutations of the two persons in the image set.

19 Claims, 5 Drawing Sheets

(56) References Cited

FOREIGN PATENT DOCUMENTS

| JP | 4490214 B2 | 6/2010 |
|---|---|---|
| JP | 2012-079354 A | 4/2012 |
| JP | 2017-037412 A | 2/2017 |

OTHER PUBLICATIONS

An Office Action; "Notice of Reasons for Refusal", mailed by the Japanese Patent Office dated Aug. 10, 2021, which corresponds to Japanese Patent Application No. 2018-184842 and is related to U.S. Appl. No. 16/564,253; with English language translation.

* cited by examiner

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2018-184842, filed on Sep. 28, 2018. The above application is hereby expressly incorporated by reference, in its entirety, into the present application.

BACKGROUND OF THE INVENTION

1. Field of the Invention

The present invention relates to an image processing device, an image processing method, a program, and a recording medium which classify a plurality of persons appearing in an image set into groups to which the person belongs and classify images included in the image set for each group.

2. Description of the Related Art

For example, there are some cases where a plurality of persons participate and a very large number of images (photos) in which the plurality of persons appears is captured by a cameraman as in a wedding reception. There are some cases where the captured images are desired to be sent as memorials to the participants.

As the related art, in a service of a Google photo application released in the United States of America, a person appearing in an image is recognized through face recognition from a face image in which a face of the person appears among images stored by a user. In a case where the user knows the contact of the person, a recommendation to share the image with the person can be given (see Anil Sabharwal, "500 million people using Google Photos, and three new ways to share", [online], May 17, 2017, Google Photos, [searching on May 1, 2018], Internet <URL:https://blog-.google/products/photos/google-photos-500-million-new-sharing/>).

For example, in the wedding reception, a groom and a bride which are main characters are key persons, and persons of a plurality of groups having various relationships with a groom and a bride such as groom and bride's parents, relatives, colleagues at work, and friends of school days are invited and are captured in images.

However, the cameraman does not understand all the relationships between the persons of the plurality of groups. Even though the cameraman understands the relationships, since the cameraman concentrates on capturing the bride and groom beautifully, the cameraman may not capture the images while being aware of the groups. Since there is a plurality of images to be captured, it is difficult for the cameraman and the groom and the bride to manually classify the plurality of images and send the images in which the person belonging to the group to the person for each group in reality.

In the related art, it may be possible to classify the images in which the person appears in the group for each person. However, in reality, there are some cases where a certain person accidentally appears in an image in which a person belonging to another group mostly appears or the certain person is accidentally out at the time of capturing an image in which the persons belonging to the group to which the certain person belongs appear. There are some cases where the former image is not a valuable image for the certain person and the latter image is a valuable image for the certain person even though the certain person does not appear.

Here, the related arts related to the present invention include JP4490214B and JP4333481B.

SUMMARY OF THE INVENTION

A first object of the present invention is to provide an image processing device, an image processing method, a program, and a recording medium which are capable of classifying a plurality of persons appearing in an image set into groups. In addition to the first object, a second object of the present invention is to provide an image processing device, an image processing method, a program, and a recording medium which are capable of classifying images included in an image set for each group.

In order to achieve the objects, the present invention provides an image processing device comprising an image set receiving unit that receives an input of an image set, a person determining unit that determines a plurality of persons appearing in the image set, a co-occurrence relation storage unit that stores co-occurrence relation information indicating that two or more persons of the plurality of persons have a co-occurrence relation in an image in a case where the two or more persons appear in the image based on a determination result of the plurality of persons using the person determining unit for each image included in the image set, a co-occurrence score calculating unit that calculates a co-occurrence score indicating strength of the co-occurrence relation of two persons in the image set based on all the co-occurrence relation information items in the image for each permutation of the two persons of the plurality of persons, and a person classifying unit that classifies at least a part of the plurality of persons into groups based on all the co-occurrence scores of the permutations of the two persons in the image set.

Here, it is preferable that the co-occurrence relation storage unit stores, as the co-occurrence relation information, a flag indicating whether or not each of the plurality of persons appears in the image, for each image.

It is preferable that the co-occurrence score calculating unit calculates the co-occurrence scores of the permutations of the two persons in the image by $1/(n-1)$ for each image in a case where n persons including the two persons appears in the image, in which n is an integer of 2 or more, sets the co-occurrence scores of the permutations of the two persons in the image as zero in a case where the two persons do not appear in the image, and calculates the co-occurrence scores of the permutations of the two persons in the image by adding all the co-occurrence scores of the permutations of the two persons in the image.

It is preferable that the person classifying unit calculates, for each person included in the plurality of persons, a total value of the co-occurrence scores of the person by adding all the co-occurrence scores of the permutations of the two persons including the person and each of persons other than the person in the image set, standardizes the co-occurrence scores by dividing each of the co-occurrence scores of the permutations of the two persons including the person and each of persons other than the person in the image set by the total value of the co-occurrence scores of the person for each person, and classifies the plurality of persons into the groups based on all the standardized co-occurrence scores of the permutations of the two persons including the person and each of persons other than the person.

It is preferable that the person classifying unit compares the standardized co-occurrence scores of two permutations of first two persons including the person and each of persons other than the person with a first threshold value for each person, and classifies the first two persons into a same group in a case where the standardized co-occurrence score of at least one of the two permutations of the first two persons is equal to or greater than the first threshold value whenever the standardized co-occurrence scores of the two permutations of the first two persons are compared with the first threshold value, classifies the first two persons into different groups in a case where the standardized co-occurrence scores of both the two permutations of the first two persons are less than the first threshold value, and confirms whether or not the first two persons are able to be classified into an existing group, and wherein in a case where the person classifying unit confirms whether or not the first two persons are able to be classified into the existing group, the person classifying unit compares the standardized co-occurrence scores of two permutations of second two persons including the person and each person belonging to the existing group with the first threshold value for each person included in the first two person, and classifies the second two persons and the person belonging to the existing group into a same group in a case where the standardized co-occurrence score of at least one of the two permutations of all the second two persons is equal to or greater than the first threshold value, and classifies the second two persons into a group different from the person belonging to the existing group in a case where there are the second two persons for which the standardized co-occurrence scores of both the two permutations are less than the first threshold value among all the second two persons.

It is preferable that the person classifying unit compares the standardized co-occurrence scores of the two permutations of the first two persons including the person and each of persons other than the person with the first threshold value for each person in order of the person for which a maximum value of the co-occurrence scores is larger, and sets the existing group as a first group, and classifies the second two persons into a second group including the person belonging to the first group in a case where the standardized co-occurrence score of at least one of the two permutations of the second two persons is equal to or greater than the first threshold value for all the second two persons.

It is preferable that the person classifying unit repeats the setting of the existing group into the first group and the classifying of the second two persons into the second group including the person belonging to the first group by twice or more.

It is preferable that the person classifying unit classifies two persons of each combination belonging to the group into levels based on the standardized co-occurrence scores of two permutations of the two persons of the combination for each combination of the two persons belonging to the group for each group.

It is preferable that the person classifying unit compares a difference between the standardized co-occurrence score of one permutation of the two permutations of the two persons of the combination and the standardized co-occurrence score of the other permutation with a second threshold value in a case where the standardized co-occurrence score of at least one permutation of the two permutations of the two persons of the combination is equal to or greater than the first threshold value, classifies the two persons of the combination into different levels in a case where the difference is equal to or greater than the second threshold value, and classifies the two persons of the combination into a same level in a case where the difference is less than the second threshold value.

It is preferable that a single fixed value is set as the first threshold value in the image processing device.

It is preferable that the image processing device further comprises a command receiving unit that receives a command of a user. It is preferable that the first threshold value is set according to the command of the user.

It is preferable that the command receiving unit comprises a box for inputting the first threshold value.

It is preferable that the command receiving unit comprises a slider bar, and the first threshold value is changed by moving the slider bar.

It is preferable that the image processing device further comprises a person display unit that displays a person belonging to the group for each group. It is preferable that in a case where the first threshold value is changed according to the command of the user, the person classifying unit classifies at least a part of the plurality of persons into groups based on the changed first threshold value, and the person display unit displays the person belonging to the group for each group classified based on the changed first threshold value.

It is preferable that the first threshold value is calculated by 1/{(total number of persons appearing in the image set+number of times of appearances of person per image in the image set)/2−1}.

It is preferable that a single fixed value is set as the second threshold value in the image processing device.

It is preferable that the image processing device further comprises a command receiving unit that receives a command of a user. It is preferable that the second threshold value is set according to the command of the user.

It is preferable that the command receiving unit comprises a box for inputting the second threshold value.

It is preferable that the command receiving unit comprises a slider bar and the second threshold value is changed by moving the slide bar.

It is preferable that the image processing device further comprises a person display unit that displays a person belonging to the level for each level. It is preferable that in a case where the second threshold value is changed according to the command of the user, the person classifying unit classifies the two persons of the combination into levels based on the changed second threshold value and the person display unit displays the person belonging to the level for each level classified based on the changed second threshold value.

It is preferable that the second threshold value is calculated by 1/{total number of persons appearing in the image set+number of times of appearances of person per image in the image set}/2−1}.

It is preferable that the image processing device further comprises an image specifying unit that specifies an image in which one or more persons belonging to the group appear from the image set for each group, a person specifying unit that specifies, as specific persons, one or more persons satisfying a predetermined condition among the plurality of persons, and an image selecting unit that selects a part of the images based on whether or not the specific persons appear in an image from among the images in which one or more persons belonging to the group appear for each group.

It is preferable that in a case where a second group including persons belonging to a first group is formed by the person classifying unit, the person specifying unit specifies that the person belonging to the first group is the specific person in the second group.

It is preferable that the image processing device further comprises a command receiving unit that receives a command of a user. It is preferable that the person specifying unit specifies, as the specific person, a person designated by the command of the user.

It is preferable that the person specifying unit sets, as a key person, a person for which the number of times of appearances in the image set is the largest, and specifies, as the specific person, one or more persons in descending order of the number of times of appearances in the image set from the key person.

It is preferable that the image selecting unit selects an image in which at least one person of the specific persons and at least one person which belongs to the group and is other than the specific persons appear together, an image in which at least one person which belongs to the group and is other than the specific persons appears, and a part of images, which satisfies a predetermined condition, of an image in which at least one person of the specific persons appears and an image in which at least one person of the specific persons and at least one person which does not belong to the group appear together, among the images in which one or more persons belonging to the group appear.

It is preferable that the image selecting unit selects, as the part of the images, one or more images in order of the images having good quality from the image having the best quality.

The present invention provides an image processing method comprising receiving, by an image set receiving unit, an input of an image set, determining, by a person determining unit, a plurality of persons appearing in the image set, storing, by a co-occurrence relation storage unit, co-occurrence relation information indicating that two or more persons of the plurality of persons have a co-occurrence relation in an image in a case where the two or more persons appear in the image based on a determination result of the plurality of persons using the person determining unit for each image included in the image set, calculating, by a co-occurrence score calculating unit, a co-occurrence score indicating strength of the co-occurrence relation of two persons in the image set based on all the co-occurrence relation information items in the image for each permutation of the two persons of the plurality of persons, and classifying, by a person classifying unit, at least a part of the plurality of persons into groups based on all the co-occurrence scores of the permutations of the two persons in the image set.

It is preferable that the classifying of at least a part of the plurality of persons into the groups includes calculating, for each person included in the plurality of persons, a total value of the co-occurrence scores of the person by adding all the co-occurrence scores of the permutations of the two persons including the person and each of persons other than the person in the image set, standardizing the co-occurrence scores by dividing each of the co-occurrence scores of the permutations of the two persons including the person and each of persons other than the person in the image set by the total value of the co-occurrence scores of the person for each person, and classifying the plurality of persons into the groups based on all the standardized co-occurrence scores of the permutations of the two persons including the person and each of persons other than the person.

It is preferable that the classifying of at least a part of the plurality of persons into the groups includes comparing the standardized co-occurrence scores of two permutations of first two persons including the person and each of persons other than the person with a first threshold value for each person, and classifying the first two persons into a same group in a case where the standardized co-occurrence score of at least one of the two permutations of the first two persons is equal to or greater than the first threshold value whenever the standardized co-occurrence scores of the two permutations of the first two persons are compared with the first threshold value, classifying the first two persons into different groups in a case where the standardized co-occurrence scores of both the two permutations of the first two persons are less than the first threshold value, and confirming whether or not the first two persons are able to be classified into an existing group, and wherein confirming whether or not the first two persons are able to be classified into the existing group includes comparing the standardized co-occurrence scores of two permutations of second two persons including the person and each person belonging to the existing group with the first threshold value for each person included in the first two person, and classifying the second two persons and the person belonging to the existing group into a same group in a case where the standardized co-occurrence score of at least one of the two permutations of all the second two persons is equal to or greater than the first threshold value, and classifying the second two persons into a group different from the person belonging to the existing group in a case where there are the second two persons for which the standardized co-occurrence scores of both the two permutations are less than the first threshold value among all the second two persons.

It is preferable that in the classifying of at least a part of the plurality of persons into the groups, two persons of each combination belonging to the group are classified into levels based on the standardized co-occurrence scores of two permutations of the two persons of the combination for each combination of the two persons belonging to the group for each group.

It is preferable that in the classifying of at least a part of the plurality of persons into the groups, a difference between the standardized co-occurrence score of one permutation of the two permutations of the two persons of the combination and the standardized co-occurrence score of the other permutation is compared with a second threshold value in a case where the standardized co-occurrence score of at least one permutation of the two permutations of the two persons of the combination is equal to or greater than the first threshold value, the two persons of the combination are classified into different levels in a case where the difference is equal to or greater than the second threshold value, and the two persons of the combination are classified into a same level in a case where the difference is less than the second threshold value.

It is preferable that the image processing method further comprises specifying, by an image specifying unit, an image in which one or more persons belonging to the group appear from the image set for each group, specifying, by a person specifying unit, as specific persons, one or more persons satisfying a predetermined condition among the plurality of persons, and selecting, by an image selecting unit, a part of the images based on whether or not the specific persons appear in an image from among the images in which one or more persons belonging to the group appear for each group.

The present invention provides a program causing a computer to execute the steps of the image processing method.

The present invention provides a non-transitory computer-readable recording medium having a program causing a computer to execute the steps of the image processing method recorded thereon.

The present invention provides an image processing device comprising an image set receiving unit that receives an input of an image set, a person determining unit that determines a plurality of persons appearing in the image set, a co-occurrence relation storage unit that stores co-occurrence relation information indicating that two or more persons of the plurality of persons have a co-occurrence relation in an image in a case where the two or more persons appear in the image based on a determination result of the plurality of persons using the person determining unit for each image included in the image set, a co-occurrence score calculating unit that calculates a co-occurrence score indicating strength of the co-occurrence relation of two persons in the image set based on all the co-occurrence relation information items in the image for each permutation of the two persons of the plurality of persons, and a person classifying unit that classifies at least a part of the plurality of persons into groups based on all the co-occurrence scores of the permutations of the two persons in the image set. The co-occurrence relation storage unit is a memory, and the image set receiving unit, the person determining unit, the co-occurrence score calculating unit, and the person classifying unit are hardware or processors that execute programs.

It is preferable that the image processing device further comprises a command receiving unit that receives a command of a user. It is preferable that the first threshold value is set according to the command of the user. It is preferable that the command receiving unit is hardware or a processor that executes a program.

It is preferable that the image processing device further comprises a person display unit that displays a person belonging to the group for each group. It is preferable that in a case where the first threshold value is changed according to the command of the user, the person classifying unit classifies at least a part of the plurality of persons into groups based on the changed first threshold value, and the person display unit displays the person belonging to the group for each group classified based on the changed first threshold value. It is preferable that the person display unit is hardware or a processor that executes a program.

It is preferable that the image processing device further comprises a command receiving unit that receives a command of a user. It is preferable that the second threshold value is set according to the command of the user. It is preferable that the command receiving unit is hardware or a processor that executes a program.

It is preferable that the image processing device further comprises a person display unit that displays a person belonging to the level for each level. It is preferable that in a case where the second threshold value is changed according to the command of the user, the person classifying unit classifies the two persons of the combination into levels based on the changed second threshold value and the person display unit displays the person belonging to the level for each level classified based on the changed second threshold value. It is preferable that the person display unit is hardware or a processor that executes a program.

It is preferable that the image processing device further comprises an image specifying unit that specifies an image in which one or more persons belonging to the group appear from the image set for each group, a person specifying unit that specifies, as specific persons, one or more persons satisfying a predetermined condition among the plurality of persons, and an image selecting unit that selects a part of the images based on whether or not the specific persons appear in an image among the images in which one or more persons belonging to the group appear for each group. It is preferable that the image specifying unit, the person specifying unit, and the image selecting unit are hardware or processors that execute programs.

It is preferable that the image processing device further comprises a command receiving unit that receives a command of a user. It is preferable that the person specifying unit specifies, as the specific person, a person designated by the command of the user. It is preferable that the command receiving unit is hardware or a processor that executes a program.

According to the present invention, it is possible to classify a plurality of persons appearing in an image set into groups based on only the image set. It is possible to classify the images included in the image set for each classified group.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
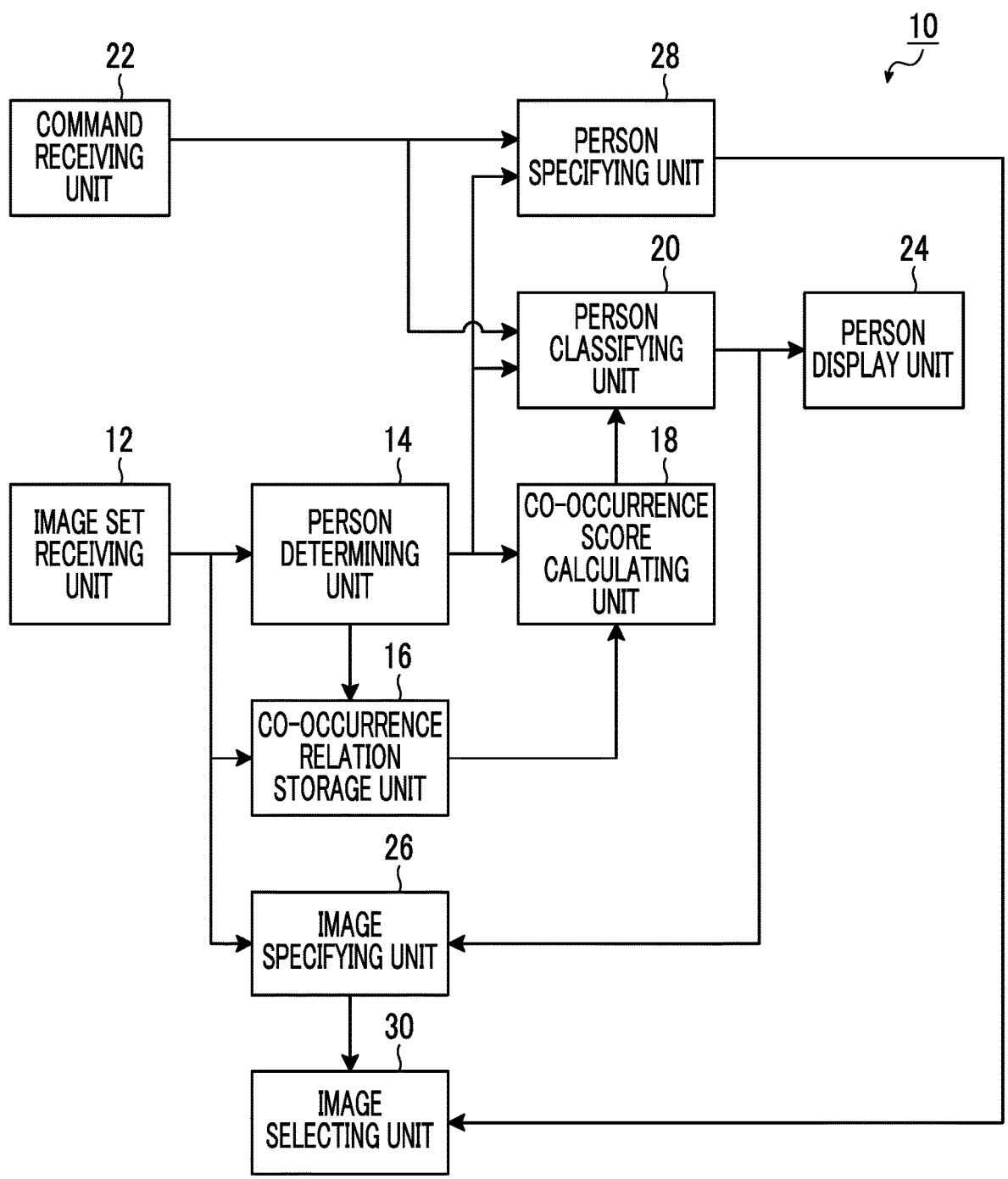
FIG. 1 is a block diagram of an embodiment showing a configuration of an image processing device according to an embodiment of the present invention.

FIG. 1 is a block diagram of an embodiment showing a configuration of an image processing system according to the embodiment of the present invention. An image processing device 10 shown in FIG. 1 classifies a plurality of persons appearing in an image set into groups, and classifies images included in the image set for each group. The image processing device 10 comprises an image set receiving unit 12, a person determining unit 14, a co-occurrence relation storage unit 16, a co-occurrence score calculating unit 18, a person classifying unit 20, a command receiving unit 22, a person display unit 24, an image specifying unit 26, a person specifying unit 28, and an image selecting unit 30.

In the image processing device 10, the image set receiving unit 12 initially receives an input of an image set.

A method of receiving the input of the image set is not particularly limited. For example, an image set transmitted through a network such as the Internet can be received and obtained. The image set is not particularly limited as long as the image set can include a plurality of images in which a plurality of persons appears. For example, an example of an image set captured in an event in which a plurality of persons participates, such as a wedding reception and a school trip, can be used.

Subsequently, the person determining unit 14 determines a plurality of persons appearing in the image set received by the image set receiving unit 12.

The person determining unit 14 recognizes faces of the persons appearing in the image by face recognition for each image included in the image set, and determines (discriminates) the persons appearing in the image.

Subsequently, in a case where two or more persons of the plurality of persons appear in the image based on the determination result of the plurality of persons using the person determining unit 14, the co-occurrence relation storage unit 16 stores the co-occurrence relation information indicating that the two or more persons have a co-occurrence relation in the image for each image included in the image set.

For example, in a case where two or more persons appear in the same image, it is considered that the two or more persons have any relationship such as friends. In the present invention, two or more persons having any relationship are expressed as having a co-occurrence relation.

The co-occurrence relation information is not particularly limited. For example, a flag indicating whether or not each of the plurality of persons appears in the image can be stored. For example, a case where the flag is "1" means that each person appears in the image, and a case where the flag is "0" means that each person does not appear in the image. As co-occurrence relation information of an image in which persons do not appear and an image in which only one person appears, co-occurrence relation information indicating that there is no co-occurrence relation may be stored, or the co-occurrence relation information may not be stored.

Subsequently, the co-occurrence score calculating unit 18 calculates strength of the co-occurrence relation of two persons in the image set, that is, a co-occurrence score indicating closeness of two persons in the image set based on all the co-occurrence relation information items in the image for permutations of two persons of the plurality of persons.

For example, a co-occurrence relation between two persons A and B in the image in which only two persons A and B appear may be stronger than a co-occurrence relation between two persons A and B in the image in which three or more persons including two persons A and B appear. That is, the co-occurrence relation between two persons in the image in which only two persons appear may be strongest, and the co-occurrence relation between two persons appearing in the image may gradually become weak as the number of persons appearing in the image becomes larger.

A method of calculating the co-occurrence score is not particularly limited. For example, in a case where n persons including two persons appear in the image in which n is an integer of 2 or more, co-occurrence scores of permutations of two persons in the image can be calculated by $1/(n-1)$. In a case where two persons do not appear in the image, the co-occurrence scores of the permutations of two persons can be zero. All the co-occurrence scores of the permutations of two persons in the image are added, and thus, a co-occurrence score (hereinafter, referred to as a co-occurrence score in the image set) of the permutations of two persons in the image set can be calculated.

Subsequently, the person classifying unit 20 classifies at least a part of the plurality of persons into groups based on all the co-occurrence scores in the image set calculated by the co-occurrence score calculating unit 18.

The person classifying unit 20 of the present embodiment calculates, for each person included in the plurality of persons, a total value of the co-occurrence scores of each person by adding all the co-occurrence scores of the permutations of two persons including each person and another person other than each person in the image set, standardizes the co-occurrence scores by dividing each of the co-occurrence scores of the permutations of two persons including each person and another person other than each person in the image set by the total value of the co-occurrence scores of each person for each person, and classifies the plurality of persons into groups based on all the standardized co-occurrence scores of the permutations of two persons including each person and another person other than each person.

The person classifying unit 20 may classify the plurality of persons determined by the person determining unit 14 into groups. For example, in the case of a wedding reception, in a case where event stuffs such as a presenter, waiters, waitresses, and camera men are known, it is more preferable that at least a part of the plurality of persons, that is, only persons who remained by excluding the event staffs and participated in the wedding reception by designating the event staffs and excluding the event staffs from the plurality of persons are classified into groups.

The person classifying unit 20 classifies two persons into levels based on the standardized co-occurrence scores of two permutations of two persons of each combination for each combination of two persons belonging to the group for each group.

The person classifying unit 20 of the present embodiment classifies two persons into levels based on a difference (absolute value) between the standardized co-occurrence score of the permutation of two permutations of two persons and the standardized co-occurrence score of the other permutation.

Subsequently, the command receiving unit 22 receives a command of a user.

As will be described below, the command receiving unit 22 receives, as the command of the user, a command to designate a specific person, and a command to change a first threshold value and a second threshold value.

Subsequently, the person display unit 24 displays a person belonging to the group for each group classified by the person classifying unit 20. The person display unit 24 displays the person belonging to the level for each level classified by the person classifying unit 20.

Subsequently, the image specifying unit 26 specifies an image in which one or more persons belonging to the group appear from the image set for each group.

Subsequently, the person specifying unit 28 specifies, as the specific person, one or more persons satisfying a predetermined condition from the plurality of persons.

A method of specifying the specific person is not particularly limited. For example, as will be described below, the person classifying unit 20 forms a second group including persons belonging to a first group, the person specifying unit 28 may specify that the person belonging to the first group is the specific person in the second group. For example, in a case where persons A and B belong to the first group and persons A to D belong to the second group, persons A and B are the specific persons in the second group.

The person specifying unit 28 may specify, as the specific person, the person designated according to the command of the user. Alternatively, the person specifying unit may use a person having the largest number of times of appearances in the image set as a key person (main character), and may specify, as the specific person, one or more persons in descending order of the number of times of appearances in the image set from the key person.

Subsequently, the image selecting unit 30 selects a part of images from the images which are specified by the image specifying unit 26 and in which one or more persons belonging to the group appear for each group based on whether or not the specified image is the image in which the specific person specified by the person specifying unit 28 appears.

For example, since a plurality of images in which the key person and another person other than the key person appear together is included in the image set in which the key person having the large number of times of appearances such as a bride and a bridegroom at the wedding reception, the key person is likely to be classified into almost all the groups. In this case, the images in which one or more persons belonging to the group appear are the majority of images included in the image set, and almost all the images are specified by the image specifying unit 26.

However, since there are a large number of images in which the key person appears, all the images are not necessarily needed. Accordingly, it is desirable that among the plurality of images in which the key person appears, only a part of the images satisfying a predetermined condition are selected by specifying the key person as the specific person. The predetermined condition is not particularly limited. For example, the quality of the image may be scored, and one or more images can be selected as a part of the images in descending order of good quality from the image having the best quality.

A method of selecting a part of images is not particularly limited. For example, an image in which at least one person of the specific persons and at least one person which belongs to the group and is other than the specific persons appear together, an image in which at least one person which belongs to the group and is other than the specific persons, and a part of images, which satisfies a predetermined condition, of an image in which at least one person of the specific persons appears and an image in which at least one person of the specific persons and at least a person which does not belong to the group appear together can be selected from the images in which one or more persons belonging to the group appear.

Figure 2:
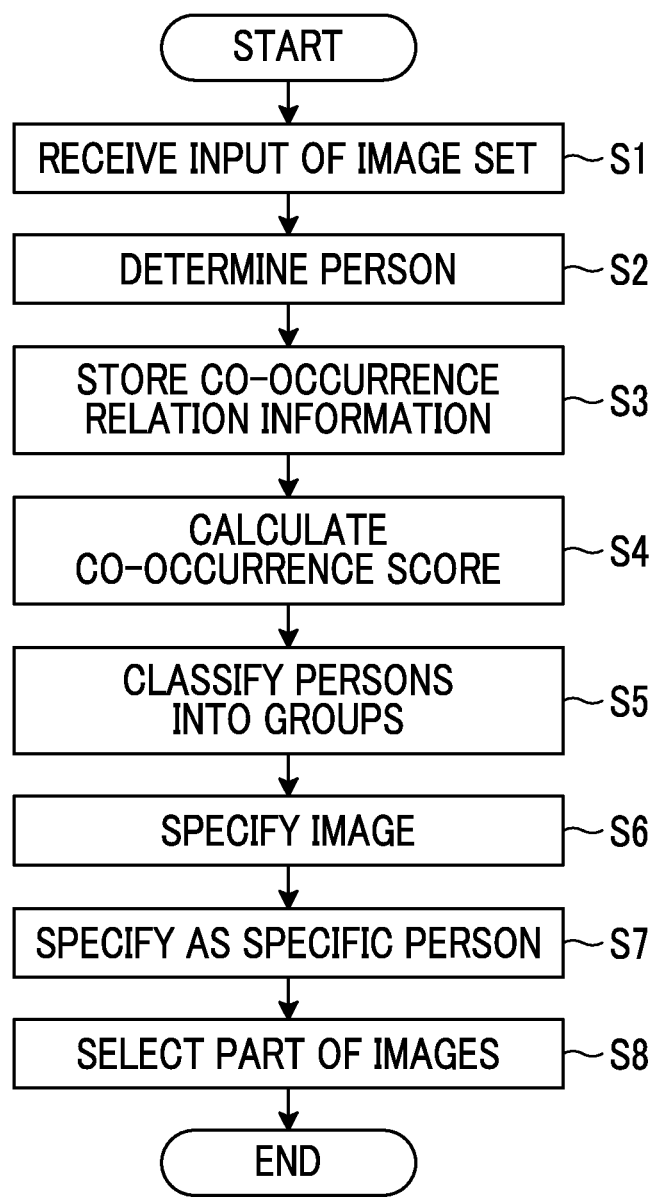
FIG. 2 is a flowchart of an example showing an entire operation of the image processing device shown in FIG. 1.

Next, an entire operation of the image processing device will be described with reference to a flowchart shown in FIG. 2.

Initially, the image set receiving unit 12 receives the input of the image set (step S1).

Subsequently, the person determining unit 14 determines the plurality of persons appearing in the image set (step S2).

Subsequently, in a case where two or more persons among of the plurality of persons appear in the image based on the determination result of the person for each image included in the image set, the co-occurrence relation storage unit 16 stores the co-occurrence relation information indicating that two or more persons have the co-occurrence relation in the image (step S3).

Subsequently, the co-occurrence score calculating unit 18 calculates the co-occurrence score in the image set based on all the co-occurrence relation information items in the image for the permutations of two persons of the plurality of persons (step S4).

In a case where there is a plurality of persons A to Z, for example, 26 persons, as permutations of two persons, the co-occurrence score calculating unit 18 calculates co-occurrence scores $S_{AA}$, $S_{AB}$, ..., $S_{AZ}$, $S_{BA}$, $S_{BB}$, ..., $S_{BZ}$, $S_{ZA}$, $S_{ZB}$, ..., $S_{ZZ}$ of 25×26 permutations of A×A, A×B, ..., A×Z, B×A, B×A, ..., B×Z, ..., Z×Z, Z×B, ..., Z×Z. The co-occurrence scores $S_{AB}$ and $S_{BA}$ of the permutations of A×B and B×A are equal. The co-occurrence scores of the permutations of two sets including other two persons are also equal. The co-occurrence scores of the permutations of two persons including the same person such as A×A and B×B may be calculated or may not be calculated.

Subsequently, the person classifying unit 20 classifies the plurality of persons into groups based on all the co-occurrence scores in the image set (step S5).

In a case where the classification of the groups is ended, the image specifying unit 26 subsequently specifies the image in which one or more persons belonging to the group appear from the image set for each group (step S6).

The person specifying unit 28 specifies, as the specific person, one or more persons, among the plurality of persons, which satisfy a predetermined condition (step S7).

Subsequently, the image selecting unit 30 selects a part of the images from the images in which one or more persons belonging to the group appear for each group based on whether or not the specified image is the image in which the specific person appears (step S8).

In the image processing device 10, it is possible to classify the plurality of persons appearing in the image set into the groups based on only the image set. It is possible to classify the images included in the image set for each classified group. The images classified into each group are images shared between the persons belonging to the group. For example, these images can be used for sending prints of the images and a photo album created by using the images to each person belonging to the group.

As stated above, all the persons belonging to the group can browse and enjoy the common image while sharing the common image by sending the common image classified into the group to each person belonging to the group compared to a case where different images are sent to the persons. Each person belonging to the group can receive the images classified into the group even in a case where the person is accidentally out and does not appear at the time of capturing the image in which the persons belonging to the group appear.

Figure 3:
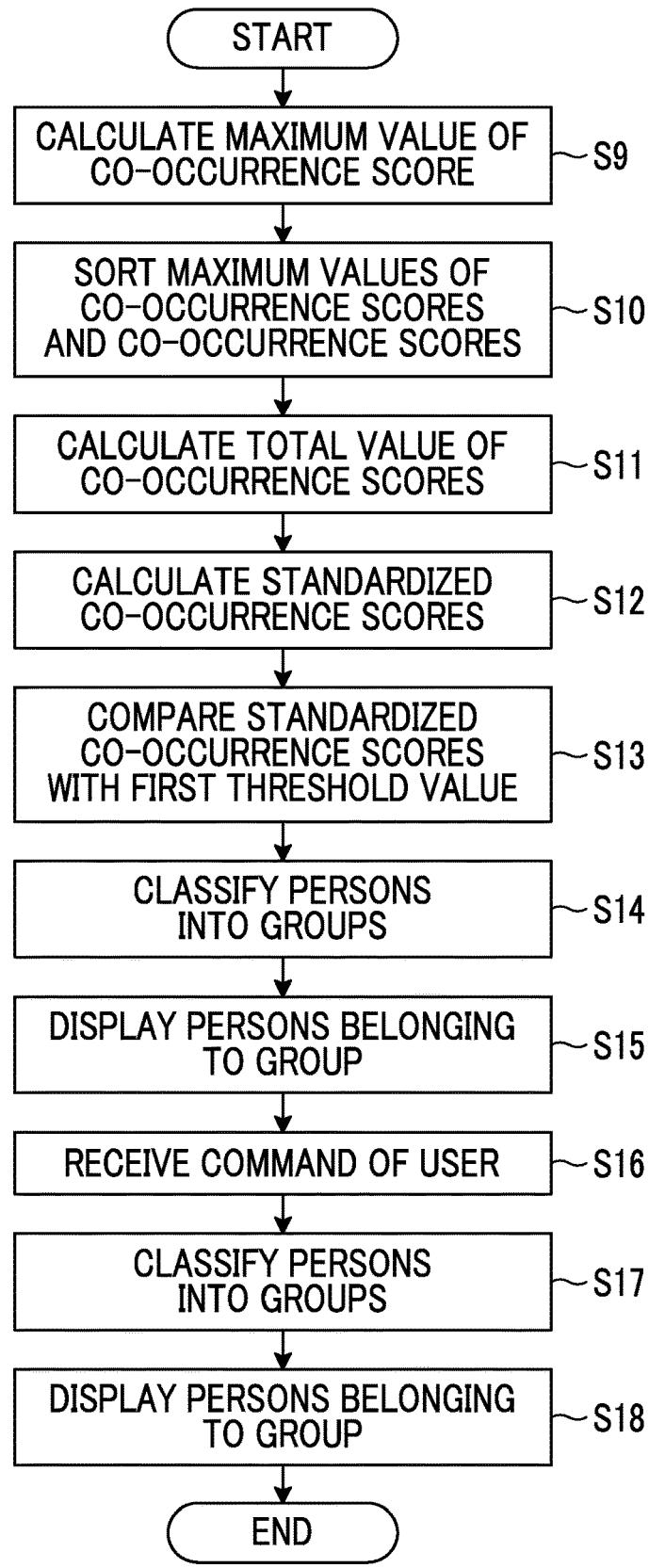
FIG. 3 is a flowchart of an example showing an operation of the image processing device at the time of classifying a plurality of persons into groups.
Figure 4:
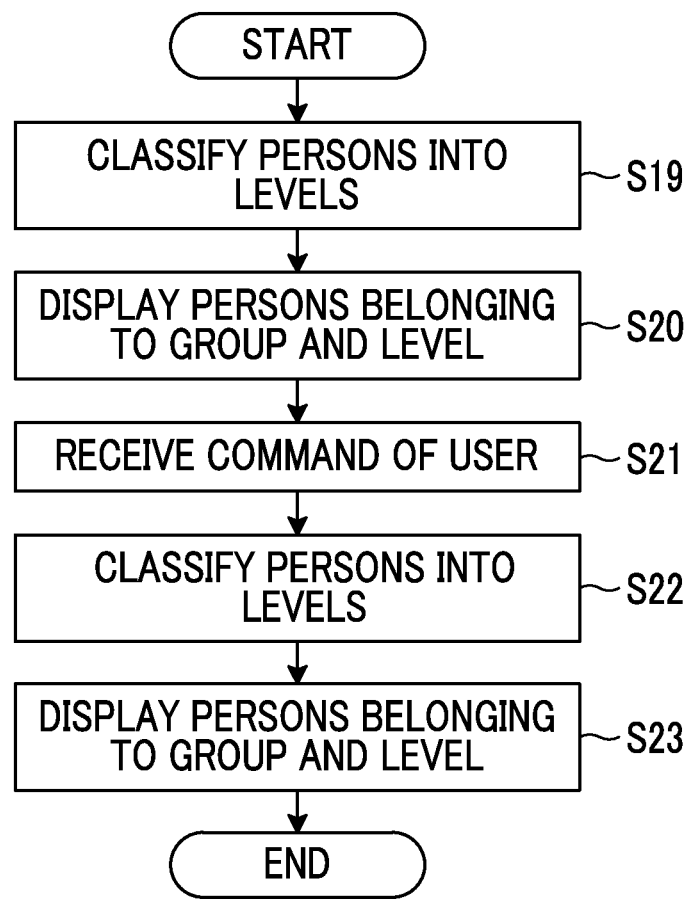
FIG. 4 is a flowchart of an example showing an operation of the image processing device at the time of classifying the plurality of persons into levels.

Next, the classification of the groups and levels of the persons will be described in detail with reference to flowcharts shown in FIGS. 3 and 4.

In a case where the plurality of persons is classified into the groups, the maximum value (hereinafter, simply referred to as the maximum value of the co-occurrence scores) of the co-occurrence scores of the permutations of two persons including each person and another person other than each person in the image set is initially obtained (step S9).

It is assumed that the plurality of persons A to Z, for example, 26 persons appears in the image set. In this case, the maximum value $S_{Amax}$ of the co-occurrence scores $S_{AB}$, $S_{AC}$, ..., $S_{AZ}$ of the permutations A×B, A×C, ..., A×Z of two persons including person A and each of persons B to Z is obtained. Similarly, the maximum values $S_{Bmax}$ to $S_{Zmax}$ of the co-occurrence scores are obtained for persons B to Z.

Subsequently, the maximum values of the co-occurrence scores of the plurality of persons in the image set are sorted in descending order, and co-occurrence scores of persons other than these plurality of persons are sorted for each person in descending order (step S10).

For example, the maximum values $S_{Amax}$ to $S_{Zmax}$ of the co-occurrence scores of the persons A to Z in the image set are sorted in descending order, and are arranged in a horizontal direction from the left side to the right side. For person A, the co-occurrence scores $S_{AB}$, $S_{AC}$, ..., $S_{AZ}$ of persons B to Z other than person A in the image set are sorted in descending order, and are arranged in a vertical direction from the upper side to the lower side. Similarly, for persons B to Z, the co-occurrence scores of the persons other than each person in the image set are sorted in descending order, and are arranged in the vertical direction. Accordingly, the maximum values of the co-occurrence scores of the plurality of persons are sorted in descending order in the horizontal direction, and the co-occurrence scores of the persons other than each person in the image set are sorted in descending order in the vertical direction for each person. Accordingly, a matrix of 25×26 can be obtained. It is desirable that the values are sorted in order to facilitate human understanding, but it may not be necessary to sort the values in the present invention.

Subsequently, all the co-occurrence scores of the permutations of two persons including each person and another person other than each person in the image set are added for each person, and thus, the total value of the co-occurrence scores of each person in the image set is calculated (step S11).

For example, all the co-occurrence scores $S_{AB}$, $S_{AC}$, . . . , $S_{AZ}$ of the permutations A×B, A×C, . . . , A×Z of two persons including person A and each of persons B to Z are added for person A, and thus, a total value $S_{Asum}$ of the co-occurrence scores of person A is calculated. Similarly, the total values $S_{Bsum}$ to $S_{Zsum}$ of the co-occurrence scores are calculated for persons B to Z.

Subsequently, the co-occurrence scores are standardized for each person by dividing each of the co-occurrence scores of the permutations of two persons including each person and another person other than each person in the image set by the total value of the co-occurrence scores of each person, and the standardized co-occurrence scores of the permutations of two persons including each person and another person other than each person are calculated (step S12). The standardized co-occurrence score is a value ranging from 0 to 1.

For example, the co-occurrence scores are standardized for person A by dividing each of the co-occurrence scores $S_{AB}$, $S_{AC}$, . . . , $S_{AZ}$ of the permutations A×B, A×C, . . . , A×Z of two persons including person A and each of persons B to Z by the total value $S_{Asum}$ of the co-occurrence scores of person A, and the standardized co-occurrence scores $S_{ABstd}$, $S_{ACstd}$, . . . , $S_{AZstd}$ are calculated. Similarly, the standardized co-occurrence scores are calculated for persons B to Z.

The co-occurrence scores in the image set depend on the number of images included in the image set. However, the standardized co-occurrence scores for each person do not depend on the number of images, and indicate strength of the co-occurrence relation between each person and another person other than each person in the image set. As the standardized co-occurrence scores become larger, each person is a person of which the co-occurrence relation in the image set is strong, that is, a person having high closeness to each person in the image set. For example, the standardized co-occurrence score $S_{ABstd}$ of the permutation A×B of persons A and B indicates the closeness between person A and person B, that is, the importance of person B from the point of view of person A.

The co-occurrence scores in the image set are standardized, and thus, the standardized co-occurrence score of one permutation of the permutations of two persons and the standardized co-occurrence score of the other permutation may be different values according to the total value of the co-occurrence scores of each person. In a case where the standardized co-occurrence score of one permutation and the standardized co-occurrence score of the other permutation are different, an orientation from one person of two persons to the other person is caused in the standardized co-occurrence scores of the permutations of two persons.

For example, the standardized co-occurrence score of the permutation A×B of two persons A and B and the co-occurrence score of the permutation B×A are equal, two persons A and B are in equal relation. Meanwhile, in a case where the standardized co-occurrence score of the permutation A×B is smaller than the standardized co-occurrence score of the permutation B×A, person A is a person who has a high relationship with the key person than person B, and person B is a person who has a low relationship with the key person than person A.

Subsequently, the standardized co-occurrence scores of two permutations of first two persons including each person and another person other than each person are compared with a first threshold value for each person included in the plurality of persons (step S13).

In the case of the plurality of persons A to Z, the standardized co-occurrence scores $S_{ABstd}$ and $S_{BAstd}$ of two permutations A×B and B×A of two persons A and B are compared with the first threshold value for the combination of two persons A and B. Similarly, the comparison is performed for combinations of persons A and C, persons A and D, . . . . The comparison is similarly performed for combinations of persons B to Z. That is, the standardized co-occurrence scores of two permutations of the first two persons are compared with the first threshold value for each person of persons A to Z.

Subsequently, the plurality of persons is classified into the groups based on the comparison results of the plurality of persons (step S14).

In this case, whenever the standardized co-occurrence scores of two permutations of the first two persons are compared with the first threshold value, the first two persons are classified into the same group in a case where the standardized co-occurrence score of at least one of two permutations of the first two persons is equal to or greater than the first threshold value, and the first two persons are classified into different groups in a case where the standardized co-occurrence scores of both two permutations of the first two persons are less than the first threshold value. It is confirmed whether or not the first two persons can be classified into the existing group.

In a case of confirming whether or not the first two persons can be classified into the existing group, the standardized co-occurrence scores of two permutations of second two persons including a person and each person belonging to the existing group are compared with the first threshold value for each person included in the first two persons. In a case where the co-occurrence score of at least one of the two permutations of all the second two persons is equal to or greater than the first threshold value, the second two persons and the person belonging to the existing group are classified into the same group. In a case where there are the second two persons for which the standardized co-occurrence scores of both two permutations are less than the first threshold value among all the second two persons, the second two persons are classified into a group different from the person belonging to the existing group.

Similarly, for the plurality of persons A to Z, for example, in a case where the standardized co-occurrence score of at least one of two permutations of the first two persons A and B is equal to or greater than the first threshold value, the first two persons A and B are classified into the same group. In a case where the standardized co-occurrence scores of both two permutations of the first two persons A and C are less than the first threshold value, the first two persons A and C are classified into different groups.

In a case of confirming whether or not the first two persons A and C can be classified into the existing group of persons A and B, the standardized co-occurrence scores of two permutations of the second two persons including each person included in the first two persons A and C and each of persons A and B belonging to the existing group, that is, persons A and A, persons A and B, persons C and A, and persons C and B are compared with the first threshold value. It is not necessary to perform the comparison for persons A and A, persons A and B, and persons C and A. As a result, in a case where the standardized co-occurrence scores of two permutations of the second two persons C and B are equal to or greater than the first threshold value, the second two persons C and B and persons A and B belonging to the existing group are classified into the same group. That is, persons A, B, and C are classified into the same group. Meanwhile, in a case where the standardized co-occurrence scores of both two permutations of the second two persons C and B are less than the first threshold value, the second two persons C and B are classified in a group different from persons A and B belonging to the existing group. That is, persons A and C are classified into a group different from persons A and B.

Similarly, the first two persons including person A and each of persons D to Z are also classified into groups. The persons are similarly classified into groups for persons B to Z.

In a case where the classification of the persons into the groups is ended, for example, the person display unit 24 displays the persons belonging to the group for each group classified by the person classifying unit 20 (step S15).

Subsequently, the command receiving unit 22 receives a command of the user to change the first threshold value (step S16).

In a case where the first threshold value is changed according to the command of the user, the person classifying unit 20 classifies the plurality of persons into the groups based on the changed first threshold value (step S17).

Subsequently, the person display unit 24 displays the persons belonging to the group for each group classified by the person classifying unit 20 based on the changed first threshold value (step S18).

The user can change a configuration of the persons belonging to the group for each group by changing the first threshold value. Accordingly, as a result of changing the first threshold value, the user can classify the plurality of persons into a more appropriate group desired by the user by repeatedly classifying the persons into the groups based on the changed first threshold value and confirming the displayed persons belonging to the group for each group.

For example, in order of the person with the largest value of the co-occurrence scores, the standardized co-occurrence scores of two permutations of the first two persons including each person and another person other than each person may be compared with the first threshold value for each person. In a case where the standardized co-occurrence score of at least one of two permutations of the second two persons is equal to or greater than the first threshold value for all the second two persons, the existing group may be the first group, and the second two persons may be classified into the second group including the persons belonging to the first group. That is, the second group is the group including the persons belonging to the first group.

The number of groups is not limited to two groups including the first group and the second group. For example, the persons may be classified into three groups including a first group, a second group, and a third group, the third group may include the persons belonging to the second group, and the second group may be a group including the persons belonging to the first group. That is, the existing group to which the person for which the maximum value of the co-occurrence scores is smaller belongs is classified as the first group, and the second two persons for which the maximum value of the co-occurrence scores is larger are classified into the second group including the persons belonging to the first group. These classifications may be repeated twice or more.

Subsequently, the persons belonging to the group are classified into levels for each group (step S19).

In a case where the persons belonging to the group are classified into the levels and the standardized co-occurrence score of at least one permutation of two permutations of two persons of each combination is equal to or greater than the first threshold value for each combination of two persons belonging to the group for each group, a difference (absolute value) between the standardized co-occurrence score of one permutation of two permutations of two persons and the standardized co-occurrence score of the other permutation is compared with a second threshold value.

The reason why the classification is performed only in a case where the standardized co-occurrence score of at least one permutation of two permutations of two persons is equal to or greater than the first threshold value is because the persons for which the standardized co-occurrence score is less than the first threshold value are not classified into the groups even in a case where the plurality of persons is classified into the groups since two persons for which the standardized co-occurrence scores of the permutations of two persons are less than the first threshold value have a weak co-occurrence relation and it is not considered that these two persons have any relationship.

As a result, in a case where the difference is equal to or greater than the second threshold value, two persons are classified into different levels. Meanwhile, in a case where the difference is less than the second threshold value, two persons are classified into the same level. That is, two persons belong to the same group. However, two persons may not belong to the same level, and may belong different levels.

For example, it is assumed that persons A to Z belong to the same group. For the combination of persons A and B belonging to the group, in a case where the standardized co-occurrence score of at least one permutation of two permutations A×B and B×A of persons A and B is equal to or greater than the first threshold value, a difference between the standardized co-occurrence score of one permutation A×B of two permutations A×B and B×A of persons A and B and the standardized co-occurrence score of the other permutation B×A is compared with the second threshold value.

As a result, in a case where the difference between the standardized co-occurrence score of one permutation A×B and the standardized co-occurrence score of the other permutation B×A is equal to or greater than the second threshold value, two persons A and B are classified into different levels. Meanwhile, in a case where the difference between the standardized co-occurrence score of one permutation A×B and the standardized co-occurrence score of the other permutation B×A is less than the second threshold value, two persons A and B are classified into the same level.

Similarly, all the combinations of two persons belonging to persons A to Z, the difference between the standardized co-occurrence score of one permutation and the standardized co-occurrence score of the other permutation is compared with the second threshold value, and persons A to Z are classified into the levels.

For example, in a case where the classification of the persons into the levels is ended, the person display unit 24 displays the persons belonging to the group and the level for each group and level classified by the person classifying unit 20 (step S20).

Subsequently, the command receiving unit 22 receives a command of the user to change the second threshold value (step S21).

In a case where the second threshold value is changed according to the command of the user, the person classifying unit 20 classifies two persons of this combination into the levels for each group based on the changed second threshold value (step S22).

Subsequently, the person display unit 24 displays the persons belonging to the group and the level for each group and level classified by the person classifying unit 20 based on the changed second threshold value (step S23).

The user can change a configuration of the persons belonging to the level for each level by changing the second threshold value. Accordingly, as a result of changing the second threshold value, the user can classify the plurality of persons into more appropriate levels by repeatedly classifying the persons into the levels based on the changed second threshold value and confirming the persons belonging to the level displayed for each level.

It is not necessary to classify the persons into the levels. For example, in a case where the number of persons belonging to the group is equal to or greater than a predetermined number, it is possible to further classify the persons belonging to the same group into the levels. It is possible to classify the plurality of images included in the image set for each classified level. Similarly to the case of the group, the images classified for each level are images shared between the persons belonging to the level, and can be used in order to send the prints and photo album of the images to each person belonging to the level, for example.

The user may simultaneously change the classification of the persons into the groups and the classification of the persons into the levels by simultaneously changing both the first threshold value and the second threshold value. As the classification of the persons into the groups and the levels, the classification of the persons into the levels may be performed after the classification of all the persons into the groups is completed. Alternatively, whenever the classification of the persons into one group is performed, the classification of the persons into the levels may be performed for one group. Alternatively, whenever new persons are classified into the group, the new persons classified into the group may be sequentially classified into the levels.

Even in the related art, the person appearing in the image can be recognized, and the determination of whether or not the persons have the co-occurrence relation can be performed based on the recognition result. However, there is no related art which the plurality of persons is classified (clustered) into the group from the co-occurrence relation between the persons.

In the related art, eve in a case where the plurality of persons can be classified into a simple group based on the co-occurrence relation between the persons, it is not possible to specify who is the key person (main character), specify another person (specific person) related with the key person with the same relationship, specify the group of the person related with the same relationship, or classify the persons belonging to the group into the levels.

Hereinafter, a specific example of the image set will be described.

Example 1

Table 1 represents names of images in an image set of a wedding reception and names of persons appearing in each image. In the image set of the wedding reception, the bride and groom are the key persons, and each attendee is a person having a relationship with at least one of the bride or the groom.

TABLE 1

|   | Bride (A) | Groom (B) | Bride's father (C) | Bride's mother (D) | Groom's father (E) | Groom's mother (F) | Bride's relative 1 (G) | Bride's relative 2 (H) |
|---|---|---|---|---|---|---|---|---|
| Entering of bride | 1 | 0 | 1 | 0 | 0 | 0 | 0 | 0 |
| Marriage vows | 1 | 1 | 0 | 0 | 0 | 0 | 0 | 0 |
| Exchange of rings | 1 | 1 | 0 | 0 | 0 | 0 | 0 | 0 |
| Group photo | 1 | 1 | 1 | 1 | 1 | 1 | 1 | 1 |
| Entering to wedding reception | 1 | 1 | 0 | 0 | 0 | 0 | 0 | 0 |
| Toast | 1 | 1 | 0 | 0 | 0 | 0 | 0 | 0 |
| Entertainment of groom's friend | 0 | 1 | 0 | 0 | 0 | 0 | 0 | 0 |
| Letter of bride's friend | 1 | 0 | 0 | 0 | 0 | 0 | 0 | 0 |
| Table set 1 | 1 | 1 | 1 | 1 | 0 | 0 | 1 | 1 |
| Table set 2 | 1 | 1 | 0 | 0 | 1 | 1 | 0 | 0 |
| Table set 3 | 1 | 1 | 0 | 0 | 0 | 0 | 0 | 0 |
| Table set 4 | 1 | 1 | 0 | 0 | 0 | 0 | 0 | 0 |
| Letter of bride | 1 | 0 | 1 | 0 | 0 | 0 | 0 | 0 |
| Groom speeches | 1 | 1 | 1 | 1 | 1 | 1 | 0 | 0 |

TABLE 1-continued

| | | | | | | | | |
|---|---|---|---|---|---|---|---|---|
| Recession | 1 | 1 | 1 | 1 | 1 | 1 | 0 | 0 |
| Number of times of appearances | 14 | 12 | 6 | 4 | 4 | 4 | 2 | 2 |
| Number of times of appearances per image | 0.933 | 0.8 | 0.4 | 0.267 | 0.267 | 0.267 | 0.133 | 0.133 |

| | Groom's relative 1 (I) | Groom's relative 2 (J) | Bride's friend 1 (K) | Bride's friend 2 (L) | Groom's friend 1 (M) | Groom's friend 2 (N) | Number of persons |
|---|---|---|---|---|---|---|---|
| Entering of bride | 0 | 0 | 0 | 0 | 0 | 0 | 2 |
| Marriage vows | 0 | 0 | 0 | 0 | 0 | 0 | 2 |
| Exchange of rings | 0 | 0 | 0 | 0 | 0 | 0 | 2 |
| Group photo | 1 | 1 | 1 | 1 | 1 | 1 | 14 |
| Entering to wedding reception | 0 | 0 | 0 | 0 | 0 | 0 | 2 |
| Toast | 0 | 0 | 0 | 0 | 0 | 0 | 2 |
| Entertainment of groom's friend | 0 | 0 | 0 | 0 | 1 | 1 | 3 |
| Letter of bride's friend | 0 | 0 | 1 | 1 | 0 | 0 | 3 |
| Table set 1 | 0 | 0 | 0 | 0 | 0 | 0 | 6 |
| Table set 2 | 1 | 1 | 0 | 0 | 0 | 0 | 6 |
| Table set 3 | 0 | 0 | 1 | 1 | 0 | 0 | 4 |
| Table set 4 | 0 | 0 | 0 | 0 | 1 | 1 | 4 |
| Letter of bride | 0 | 0 | 0 | 0 | 0 | 0 | 2 |
| Groom speeches | 0 | 0 | 0 | 0 | 0 | 0 | 6 |
| Recession | 0 | 0 | 1 | 0 | 0 | 1 | 8 |
| Number of times of appearances | 2 | 2 | 4 | 3 | 3 | 4 | 66 |
| Number of times of appearances per image | 0.133 | 0.133 | 0.267 | 0.2 | 0.2 | 0.267 | 4.4 |

Each name of each image is represented in each of the second to sixteenth rows from the upper side at a left-end column of Table 1. The names of the images are an image of entering of a bride, an image of marriage vows, an image of exchange of rings, an image of a group photo, an image of entering to wedding reception, an image of a toast, an image of entertainment of groom's friend, an image of a letter of bride's friend, images of table sets 1 to 4, an image of a letter of a bride, an image of groom speeches, and an image of recession. The total number of images in the image set is 15. Although the names of scenes of the images have been described for the sake of convenience in description, the image processing device according to the embodiment of the present invention does not understand the names of the scenes of the images. Although roles in the wedding ceremony such as "bride" and "groom" have been described for the sake of convenience in description, the image processing device according to the embodiment of the present invention does not understand the roles of the persons. However, it is possible to determine the persons appearing in the image by recognizing the faces of the persons appearing in the image through face recognition.

Each name of each person is represented in each of the second to fifteenth columns from the left side in the uppermost row of Table 1. The names of the persons are bride (hereinafter, referred to as person A, and the same is true of other persons), groom (B), bride's father (C), bride's mother (D), groom's father (E), groom's mother (F), bride's relative 1 (G), bride's relative 2 (H), groom's relative 1 (I), groom's relative 2 (J), bride's friend 1 (K), bride's friend 2 (L), groom's friend 1 (M), and groom's friend 2 (N). The total number of persons is 14.

A flag indicating whether or not each of persons A to N appears in each image is represented as the co-occurrence relation information in each of the second to sixteenth rows from the upper side and the second to fifteenth columns from the left side of Table 1. A case where the flag is "1" means that the person appears in the image, and a case where the flag is "0" means that the person does not appear in the image. For example, the bride and the bride's father appear in the image of entering of a bride. That is, the bride and the bride's father have the co-occurrence relation in the image of entering of a bride.

In each of the second to fifteenth columns from the left side in the second row from the lower side of Table 1, the number of times of appearances of each person in the image set (the number of images in which each person appears in the image set) is represented, and the number of times of appearances of each person per image is represented in each of the second to fifteenth columns from the left side in the last row of Table 1. For example, the number of times of appearances of the bride in the image set is 14, and the number of times of appearances of the bride per image is $14/15$=about 0.933.

The number of persons appearing in each image is represented in each of the second to sixteenth rows from the upper side in the right-end column of Table 1. For example, the number of persons appearing in the image of entering of a bride is two persons of the bride and the bride's father.

The total number of times of appearances of the persons in the image set is represented in the second row from the lower side of the right-end column of Table 1, and the number of times of appearances of the persons per image is represented in the last row in the right-end column of Table 1. The total number of times of appearances of the persons in the image set is 66, and the number of times of appearances of the persons per image is 66/15=4.4.

Subsequently, Table 2 represents the co-occurrence scores of the images of the permutations of bride A and each of persons A and N.

A×N of bride A and persons A to N are represented in the second to fifteenth columns from the left side in the uppermost row of Table 2.

For example, the co-occurrence scores of the permutation A×B of bride A and groom B in the images are represented in the second to sixteenth rows in the third column from the left side of Table 2. Since bride A and groom B do not appear together in the image of entering of a bride, the co-occurrence score of the permutation A×B of bride A and groom B in the image of entering of a bride is zero. Since bride A and groom B appear together in the image of marriage vows and the total number of persons appearing in the image of marriage vows is 2 (n=2), the co-occurrence score of the permutation A×B of bride A and groom B in the image of entering of a bride is $1/(n-1)=1/(2-1)=1$.

The co-occurrence score of the permutation A×B of bride A and groom B in the image set is represented in the last row in the third column from the left side of Table 2. The co-occurrence score of the permutation A×B of bride A and groom B in the image set is 0+1+1+0.077+1+1+0+0+0.2+0.2+0.333+0.333+0+0.2+0.143=about 5.486 by adding the co-occurrence scores of the permutation A×B of bride A and groom B in all the images.

TABLE 2

|  | A×A | A×B | A×C | A×D | A×E | A×F | A×G | A×H | A×I | A×J | A×K | A×L | A×M | A×N |
|---|---|---|---|---|---|---|---|---|---|---|---|---|---|---|
| Entering of bride | 1 | 0 | 1 | 0 | 0 | 0 | 0 | 0 | 0 | 0 | 0 | 0 | 0 | 0 |
| Marriage vows | 1 | 1 | 0 | 0 | 0 | 0 | 0 | 0 | 0 | 0 | 0 | 0 | 0 | 0 |
| Exchange of rings | 1 | 1 | 0 | 0 | 0 | 0 | 0 | 0 | 0 | 0 | 0 | 0 | 0 | 0 |
| Group photo | 0.077 | 0.077 | 0.077 | 0.077 | 0.077 | 0.077 | 0.077 | 0.077 | 0.077 | 0.077 | 0.077 | 0.077 | 0.077 | 0.077 |
| Entering to wedding reception | 1 | 1 | 0 | 0 | 0 | 0 | 0 | 0 | 0 | 0 | 0 | 0 | 0 | 0 |
| Toast | 1 | 1 | 0 | 0 | 0 | 0 | 0 | 0 | 0 | 0 | 0 | 0 | 0 | 0 |
| Entertainment of groom's friend | 0 | 0 | 0 | 0 | 0 | 0 | 0 | 0 | 0 | 0 | 0 | 0 | 0 | 0 |
| Letter of bride's friend | 0.5 | 0 | 0 | 0 | 0 | 0 | 0 | 0 | 0 | 0 | 0.5 | 0.5 | 0 | 0 |
| Table set 1 | 0.2 | 0.2 | 0.2 | 0.2 | 0 | 0 | 0.2 | 0.2 | 0 | 0 | 0 | 0 | 0 | 0 |
| Table set 2 | 0.2 | 0.2 | 0 | 0 | 0.2 | 0.2 | 0 | 0 | 0.2 | 0.2 | 0 | 0 | 0 | 0 |
| Table set 3 | 0.333 | 0.333 | 0 | 0 | 0 | 0 | 0 | 0 | 0 | 0 | 0.333 | 0.333 | 0 | 0 |
| Table set 4 | 0.333 | 0.333 | 0 | 0 | 0 | 0 | 0 | 0 | 0 | 0 | 0 | 0 | 0.333 | 0.333 |
| Letter of bride | 1 | 0 | 1 | 0 | 0 | 0 | 0 | 0 | 0 | 0 | 0 | 0 | 0 | 0 |
| Groom speeches | 0.2 | 0.2 | 0.2 | 0.2 | 0.2 | 0.2 | 0 | 0 | 0 | 0 | 0 | 0 | 0 | 0 |
| Recession | 0.143 | 0.143 | 0.143 | 0.143 | 0.143 | 0.143 | 0 | 0 | 0 | 0 | 0.143 | 0 | 0 | 0.143 |
|  | 7.986 | 5.486 | 2.620 | 0.620 | 0.620 | 0.620 | 0.277 | 0.277 | 0.277 | 0.277 | 1.053 | 0.910 | 0.410 | 0.553 |

As in Table 1, each name of each image is represented in each of the second to sixteenth rows from the upper side in the left-end column of Table 2.

The names of the permutations A×A, A×B, A×C, A×D, A×E, A×F, A×G, A×H, A×I, A×J, A×K, A×L, A×M, and Similarly, the co-occurrence score of the permutation of two persons other than the permutation of bride A and each of persons B to N can also be calculated.

Subsequently, Table 3 represents the co-occurrence scores in the image set.

TABLE 3

|  | A | B | C | D | E | F | G | H | I | J | K | L | M | N |
|---|---|---|---|---|---|---|---|---|---|---|---|---|---|---|
| A |  | 5.486 | 2.620 | 0.620 | 0.620 | 0.620 | 0.277 | 0.277 | 0.277 | 0.277 | 1.053 | 0.910 | 0.410 | 0.553 |
| B | 5.486 |  | 0.620 | 0.620 | 0.620 | 0.620 | 0.277 | 0.277 | 0.277 | 0.277 | 0.553 | 0.410 | 0.910 | 1.053 |
| C | 2.620 | 0.620 |  | 0.620 | 0.420 | 0.420 | 0.277 | 0.277 | 0.077 | 0.077 | 0.220 | 0.077 | 0.077 | 0.220 |
| D | 0.620 | 0.620 | 0.620 |  | 0.420 | 0.420 | 0.277 | 0.277 | 0.077 | 0.077 | 0.220 | 0.077 | 0.077 | 0.220 |
| E | 0.620 | 0.620 | 0.420 | 0.420 |  | 0.620 | 0.077 | 0.077 | 0.277 | 0.277 | 0.220 | 0.077 | 0.077 | 0.220 |
| F | 0.620 | 0.620 | 0.420 | 0.420 | 0.620 |  | 0.077 | 0.077 | 0.277 | 0.277 | 0.220 | 0.077 | 0.077 | 0.220 |
| G | 0.277 | 0.277 | 0.277 | 0.277 | 0.077 | 0.077 |  | 0.277 | 0.077 | 0.077 | 0.077 | 0.077 | 0.077 | 0.077 |
| H | 0.277 | 0.277 | 0.277 | 0.277 | 0.077 | 0.077 | 0.277 |  | 0.077 | 0.077 | 0.077 | 0.077 | 0.077 | 0.077 |
| I | 0.277 | 0.277 | 0.077 | 0.077 | 0.277 | 0.277 | 0.077 | 0.077 |  | 0.277 | 0.077 | 0.077 | 0.077 | 0.077 |
| J | 0.277 | 0.277 | 0.077 | 0.077 | 0.277 | 0.277 | 0.077 | 0.077 | 0.277 |  | 0.077 | 0.077 | 0.077 | 0.077 |
| K | 1.053 | 0.553 | 0.220 | 0.220 | 0.220 | 0.220 | 0.077 | 0.077 | 0.077 | 0.077 |  | 0.910 | 0.077 | 0.220 |
| L | 0.910 | 0.410 | 0.077 | 0.077 | 0.077 | 0.077 | 0.077 | 0.077 | 0.077 | 0.077 | 0.910 |  | 0.077 | 0.077 |
| M | 0.410 | 0.910 | 0.077 | 0.077 | 0.077 | 0.077 | 0.077 | 0.077 | 0.077 | 0.077 | 0.077 | 0.077 |  | 0.910 |
| N | 0.553 | 1.053 | 0.220 | 0.220 | 0.220 | 0.220 | 0.077 | 0.077 | 0.077 | 0.077 | 0.220 | 0.077 | 0.910 |  |
| Number of images | 14 | 12 | 6 | 4 | 4 | 4 | 2 | 2 | 2 | 2 | 4 | 3 | 3 | 4 |

The names A to N of the persons are represented in the second to fifteenth columns from the left side in the uppermost row of Table 3. Similarly, the names A to N of the persons are represented in the second to fifteenth rows from the upper side in the left-end column of Table 3.

The co-occurrence scores in the image set are represented in the second to fifteenth rows from the upper side and the second to fifteenth columns from the left side of Table 3. For example, the co-occurrence score of the permutation of bride A and groom B in the image set is about 5.486. In Table 3, for example, the co-occurrence scores of the permutations of two persons including the same person are excluded as in the permutation of bride A and bride A.

The number of images in which each person appears in the image set is represented in each of the second to fifteenth columns from the left side in the last row of Table 3. For example, the number of images in which bride A appears in the image set is 14 as represented in the second row from the lower side and in the second column from the left side.

Subsequently, in Table 4 and Table 5, the maximum values of the co-occurrence scores of the plurality of persons in the image set are sorted in descending order and the co-occurrence scores of other persons other than each person in the image set are sorted in descending order based on the co-occurrence scores of Table 3.

TABLE 4

|  | A |  | B |  | C |  | K |  | N |  | M |  | L |  |
|---|---|---|---|---|---|---|---|---|---|---|---|---|---|---|
|  | B | 5.486 | A | 5.486 | A | 2.620 | A | 1.053 | B | 1.053 | B | 0.910 | A | 0.910 |
|  | C | 2.620 | N | 1.053 | B | 0.620 | L | 0.910 | M | 0.910 | N | 0.910 | K | 0.910 |
|  | K | 1.053 | M | 0.910 | D | 0.620 | B | 0.553 | A | 0.553 | A | 0.410 | B | 0.410 |
|  | L | 0.910 | C | 0.620 | E | 0.420 | C | 0.220 | C | 0.220 | C | 0.077 | C | 0.077 |
|  | D | 0.620 | D | 0.620 | F | 0.420 | D | 0.220 | D | 0.220 | D | 0.077 | D | 0.077 |
|  | E | 0.620 | E | 0.620 | G | 0.277 | E | 0.220 | E | 0.220 | E | 0.077 | E | 0.077 |
|  | F | 0.620 | F | 0.620 | H | 0.277 | F | 0.220 | F | 0.220 | F | 0.077 | F | 0.077 |
|  | N | 0.553 | K | 0.553 | K | 0.220 | N | 0.220 | K | 0.220 | G | 0.077 | G | 0.077 |
|  | M | 0.410 | L | 0.410 | N | 0.220 | G | 0.077 | G | 0.077 | H | 0.077 | H | 0.077 |
|  | G | 0.277 | G | 0.277 | L | 0.077 | H | 0.077 | H | 0.077 | I | 0.077 | I | 0.077 |
|  | H | 0.277 | H | 0.277 | I | 0.077 | I | 0.077 | I | 0.077 | J | 0.077 | J | 0.077 |
|  | I | 0.277 | I | 0.277 | J | 0.077 | J | 0.077 | J | 0.077 | K | 0.077 | M | 0.077 |
|  | J | 0.277 | J | 0.277 | M | 0.077 | M | 0.077 | L | 0.077 | L | 0.077 | N | 0.077 |
| Total | 14 |  | 12 |  | 6 |  | 4 |  | 4 |  | 3 |  | 3 |  |

TABLE 5

|  | D |  | E |  | F |  | G |  | H |  | I |  | J |  |
|---|---|---|---|---|---|---|---|---|---|---|---|---|---|---|
| A | 0.620 | A | 0.620 | A | 0.620 | A | 0.277 | A | 0.277 | A | 0.277 | A | 0.277 |
| B | 0.620 | B | 0.620 | B | 0.620 | B | 0.277 | B | 0.277 | B | 0.277 | B | 0.277 |
| C | 0.620 | F | 0.620 | E | 0.620 | C | 0.277 | C | 0.277 | E | 0.277 | E | 0.277 |
| E | 0.420 | C | 0.420 | C | 0.420 | D | 0.277 | D | 0.277 | F | 0.277 | F | 0.277 |
| F | 0.420 | D | 0.420 | D | 0.420 | H | 0.277 | G | 0.277 | J | 0.277 | I | 0.277 |
| G | 0.277 | I | 0.277 | I | 0.277 | E | 0.077 | E | 0.077 | C | 0.077 | C | 0.077 |
| H | 0.277 | J | 0.277 | J | 0.277 | F | 0.077 | F | 0.077 | D | 0.077 | D | 0.077 |
| K | 0.220 | K | 0.220 | K | 0.220 | I | 0.077 | I | 0.077 | G | 0.077 | G | 0.077 |
| N | 0.220 | N | 0.220 | N | 0.220 | J | 0.077 | J | 0.077 | H | 0.077 | H | 0.077 |
| I | 0.077 | G | 0.077 | G | 0.077 | K | 0.077 | K | 0.077 | K | 0.077 | K | 0.077 |
| J | 0.077 | H | 0.077 | H | 0.077 | L | 0.077 | L | 0.077 | L | 0.077 | L | 0.077 |

TABLE 5-continued

|   | D | | E | | F | | G | | H | | I | | J |
|---|---|---|---|---|---|---|---|---|---|---|---|---|---|
| L | 0.077 | L | 0.077 | L | 0.077 | M | 0.077 | M | 0.077 | M | 0.077 | M | 0.077 |
| M | 0.077 | M | 0.077 | M | 0.077 | N | 0.077 | N | 0.077 | N | 0.077 | N | 0.077 |
| Total | 4 | | 4 | | 4 | | 2 | | 2 | | 2 | | 2 |

The names of the persons are represented in even-numbered columns in the uppermost rows of Table 4 and Table 5 from the left side in order of the person with the maximum value of the co-occurrence scores in the image set. The names of the persons are A, B, C, K, N, M, L, D, E, F, G, H, I, and J from the lefts side.

For example, the co-occurrence scores of the permutations of bride A and persons B to N in the image set are represented in the left-end column and the second column from the left side of Table 4. The co-occurrence scores of the permutations of bride A and persons B to N in the image set are represented in the second column from the left side of Table 4 from the upper side in descending order. The names of persons B to N other than bride A are represented in the left-end column of Table 4 from the upper side in order of the person with a large co-occurrence score in the image set.

The total values of the co-occurrence scores in the image set for each person are represented in the even-numbered columns of the last rows of Table 4 and Table 5. For example, as represented in the second column from the left side in the last row of Table 4, the total value of the co-occurrence scores of the permutations of bride A and persons B to N in the image set is 5.486+2.620+1.053+ 0.910+0.620+0.620+0.620+0.553+0.410+0.277+0.277+ 0.277+0.277=14 by adding all the co-occurrence scores of the permutations of bride A and persons B to N.

Subsequently, the standardized co-occurrence scores are represented in Table 6 and Table 7 by dividing the co-occurrence scores of Table 4 and Table 5 by the total values of the co-occurrence scores of the persons for each person.

TABLE 6

|   | A | | B | | C | | K | | N | | M | | L |
|---|---|---|---|---|---|---|---|---|---|---|---|---|---|
| B | 0.392 | A | 0.457 | A | 0.437 | A | 0.263 | B | 0.263 | B | 0.303 | A | 0.303 |
| C | 0.187 | N | 0.088 | B | 0.103 | L | 0.228 | M | 0.228 | N | 0.303 | K | 0.303 |
| K | 0.075 | M | 0.076 | D | 0.103 | B | 0.138 | A | 0.138 | A | 0.137 | B | 0.137 |
| L | 0.065 | C | 0.052 | E | 0.070 | C | 0.055 | C | 0.055 | C | 0.026 | C | 0.026 |
| D | 0.044 | D | 0.052 | F | 0.070 | D | 0.055 | D | 0.055 | D | 0.026 | D | 0.026 |
| E | 0.044 | E | 0.052 | G | 0.046 | E | 0.055 | E | 0.055 | E | 0.026 | E | 0.026 |
| F | 0.044 | F | 0.052 | H | 0.046 | F | 0.055 | F | 0.055 | F | 0.026 | F | 0.026 |
| N | 0.040 | K | 0.046 | K | 0.037 | N | 0.055 | K | 0.055 | G | 0.026 | G | 0.026 |
| M | 0.029 | L | 0.034 | N | 0.037 | G | 0.019 | G | 0.019 | H | 0.026 | H | 0.026 |
| G | 0.020 | G | 0.023 | I | 0.013 | H | 0.019 | H | 0.019 | I | 0.026 | I | 0.026 |
| H | 0.020 | H | 0.023 | J | 0.013 | I | 0.019 | I | 0.019 | J | 0.026 | J | 0.026 |
| I | 0.020 | I | 0.023 | L | 0.013 | J | 0.019 | J | 0.019 | K | 0.026 | M | 0.026 |
| J | 0.020 | J | 0.023 | M | 0.013 | M | 0.019 | L | 0.019 | L | 0.026 | N | 0.026 |
| Total | 1 | | 1 | | 1 | | 1 | | 1 | | 1 | | 1 |

TABLE 7

|   | D | | E | | F | | G | | H | | I | | J |
|---|---|---|---|---|---|---|---|---|---|---|---|---|---|
| A | 0.155 | A | 0.155 | A | 0.155 | A | 0.138 | A | 0.138 | A | 0.138 | A | 0.138 |
| B | 0.155 | B | 0.155 | B | 0.155 | B | 0.138 | B | 0.138 | B | 0.138 | B | 0.138 |
| C | 0.155 | F | 0.155 | E | 0.155 | C | 0.138 | C | 0.138 | E | 0.138 | E | 0.138 |
| E | 0.105 | C | 0.105 | C | 0.105 | D | 0.138 | D | 0.138 | F | 0.138 | F | 0.138 |
| F | 0.105 | D | 0.105 | D | 0.105 | H | 0.138 | G | 0.138 | J | 0.138 | I | 0.138 |
| G | 0.069 | I | 0.069 | I | 0.069 | E | 0.038 | E | 0.038 | C | 0.038 | C | 0.038 |
| H | 0.069 | J | 0.069 | J | 0.069 | F | 0.038 | F | 0.038 | D | 0.038 | D | 0.038 |
| K | 0.055 | K | 0.055 | K | 0.055 | I | 0.038 | I | 0.038 | G | 0.038 | G | 0.038 |
| N | 0.055 | N | 0.055 | N | 0.055 | J | 0.038 | J | 0.038 | H | 0.038 | H | 0.038 |
| I | 0.019 | G | 0.019 | G | 0.019 | K | 0.038 | K | 0.038 | K | 0.038 | K | 0.038 |
| J | 0.019 | H | 0.019 | H | 0.019 | L | 0.038 | L | 0.038 | L | 0.038 | L | 0.038 |
| L | 0.019 | L | 0.019 | L | 0.019 | M | 0.038 | M | 0.038 | M | 0.038 | M | 0.038 |
| M | 0.019 | M | 0.019 | M | 0.019 | N | 0.038 | N | 0.038 | N | 0.038 | N | 0.038 |
| Total | 1 | | 1 | | 1 | | 1 | | 1 | | 1 | | 1 |

For example, the standardized co-occurrence scores of the permutations of bride A and persons B to N are represented in the second column from the left side of Table 6 from the upper side in descending order. The standardized co-occurrence score of the permutation of bride A and groom B is about 5.486/14=about 0.392, and the standardized co-occurrence score of the permutation of groom B and bride A is about 5.486/12=about 0.457.

Subsequently, for example, the first threshold value is 0.122, and 14 persons A to N are classified into the groups.

Table 8 and Table 9 represent a result of comparing the standardized co-occurrence scores of two permutations of two persons including each person and another person other than each person with the first threshold value for each person included in the plurality of persons.

TABLE 8

| | | | | | | |
|---|---|---|---|---|---|---|
| AB = O, O | BA = O, O | CA = O, O | DA = O, X | EA = O, X | FA = O, X | GA = O, X |
| AC = O, O | BC = X, X | CB = X, X | DB = O, X | EB = O, X | FB = O, X | GB = O, X |
| AD = X, O | BD = X, O | CD = X, O | DC = O, X | EC = X, X | FC = X, X | GC = O, X |
| AE = X, O | BE = X, O | CE = X, X | DE = X, X | ED = X, X | FD = X, X | GD = O, X |
| AF = X, O | BF = X, O | CF = X, X | DF = X, X | EF = O, O | FE = O, O | GE = X, X |
| AG = X, O | BG = X, O | CG = X, O | DG = X, O | EG = X, X | FG = X, X | GF = X, X |
| AH = X, O | BH = X, O | CH = X, O | DH = X, O | EH = X, X | FH = X, X | GH = O, O |
| AI = X, O | BI = X, O | CI = X, X | DI = X, X | EI = X, O | FI = X, O | GI = X, X |
| AJ = X, O | BJ = X, O | CJ = X, X | DJ = X, X | EJ = X, O | FJ = X, O | GJ = X, X |
| AK = X, O | BK = X, O | CK = X, X | DK = X, X | EK = X, X | FK = X, X | GK = X, X |
| AL = X, O | BL = X, O | CL = X, X | DL = X, X | EL = X, X | FL = X, X | GL = X, X |
| AM = X, O | BM = X, O | CM = X, X | DM = X, X | EM = X, X | FM = X, X | GM = X, X |
| AN = X, O | BN = X, O | CN = X, X | DN = X, X | EN = X, X | FN = X, X | GN = X, X |

TABLE 9

| | | | | | | |
|---|---|---|---|---|---|---|
| HA = O, X | IA = O, X | JA = O, X | KA = O, X | LA = O, X | MA = O, X | NA = O, X |
| HB = O, X | IB = O, X | JB = O, X | KB = O, X | LB = O, X | MB = O, X | NB = O, X |
| HC = O, X | IC = X, X | JC = X, X | KC = X, X | LC = X, X | MC = X, X | NC = X, X |
| HD = O, X | ID = X, X | JD = X, X | KD = X, X | LD = X, X | MD = X, X | ND = X, X |
| HE = X, X | IE = O, X | JE = O, X | KE = X, X | LE = X, X | ME = X, X | NE = X, X |
| HF = X, X | IF = O, X | JF = O, X | KF = X, X | LF = X, X | MF = X, X | NF = X, X |
| HG = O, O | IG = X, X | JG = X, X | KG = X, X | LG = X, X | MG = X, X | NG = X, X |
| HI = X, X | IH = X, X | JH = X, X | KH = X, X | LH = X, X | MH = X, X | NH = X, X |
| HJ = X, X | IJ = O, O | JI = O, O | KI = X, X | LI = X, X | MI = X, X | NI = X, X |
| HK = X, X | IK = X, X | JK = X, X | KJ = X, X | LJ = X, X | MJ = X, X | NJ = X, X |
| HL = X, X | IL = X, X | JL = X, X | KL = O, O | LK = O, O | MK = X, X | NK = X, X |
| HM = X, X | IM = X, X | JM = X, X | KM = X, X | LM = X, X | ML = X, X | NL = X, X |
| HN = X, X | IN = X, X | JN = X, X | KN = X, X | LN = X, X | MN = O, O | NM = O, O |

For example, in Table 8, AD represents two permutations A×D and D×A of two persons A and D. AD=X, O represents permutation A×D=X and permutation D×A=0. Permutation A×D=X represents that the standardized co-occurrence score of permutation A×D is less than the first threshold value, and permutation D×A=0 represents that the standardized co-occurrence score of permutation D×A is equal to or greater than the first threshold value.

For person A, initially, since AB=O, O, persons A and B are classified into the same group.

Subsequently, since AC=O, O, persons A and C are classified into the same group. In this case, it is confirmed whether or not persons A and C can be classified into the existing group of persons A and B. As a result, since CA=O, O and CB=X, X, person C is not classified into the existing group of persons A and B. Since person A belongs to the existing group of persons A and B, it is not necessary to perform the confirmation. The same is true of person A.

Subsequently, since AD=X, O, persons A and D are classified into the same group. In this case, it is confirmed whether or not person D can be classified into the existing group of persons A and B and the group of persons A and C. As a result, since DA=O, X and DB=O, X, persons A, B, and D are classified into the same group. Since DA=O, X and DC=O, X, persons A, C, D are classified into the same group.

Subsequently, since AE=X, O, persons A and E are classified into the same group. In this case, it is confirmed whether or not person E can be classified into the existing group of persons A, B, and D and the group of A, C, and D. As a result, since EA=O, X, EB=O, X, and ED=X, X, person E is not classified into the existing group of persons A, B, and D. Since EA=O, X, EC=X, X, and ED=X, X, person E is not classified into the existing group of persons A, C, and D.

Subsequently, since AF=X, O, persons A and F are classified into the same group. In this case, it is confirmed whether or not person F can be classified into the existing group of persons A, B, and D, the group of persons A, C, and D, and the group of persons A and E. As a result, since FA=O, X, FB=O, X, and FD=X, X, person F is not classified into the existing group of persons A, B, and D. Since FA=O, X, FC=X, X, and FD=X, X, person F is not classified into the existing group of persons A, C, and D. Since FA=O, X and FE=O, O, persons A, E, F are classified into the same group.

Subsequently, since AG=X, O, persons A and G are classified into the same group. In this case, it is confirmed whether or not person G can be classified into the existing group of persons A, B, and D, the group of persons A, C, and D, and the group of persons A, E, and F. As a result, since GA=O, X, GB=O, X, and GD=O, X, persons A, B, and G are classified into the same group. Since GA=O, X, GC=O, X, and GD=O, X, persons A, C, D, and G are classified into the same group. Since GA=O, X, GE=X, X, and GF=X, X, person G is not classified into the existing group of persons A, E, and F.

Subsequently, since AH=X, O, persons A and H are classified into the same group. In this case, it is confirmed whether or not persons H can be classified into the existing group of persons A, B, D, and G, the group of persons A, C, D, and G, and the group of persons A, E, and F. As a result, since HA=O, X, HB=O, X, HD=O, X, and HG=O, O, persons A, B, D, G, and H are classified into the same group. Since HA=O, X, HC=O, X, HD=O, X, and HG=O, O, persons A, C, D, G, and H are classified into the same group. Since HA=O, X, HE=X, X, and HF=X, X, person G is not classified into the existing group of persons A, E, and F.

Subsequently, since AI=X, O, persons A and I are classified into the same group. In this case, it is confirmed whether or not person I can be classified into the existing group of persons A, B, D, G and H, the group of persons A, C, D, G, and H, and the group of persons A, E, and F. As a result, since IA=O, X, IB=O, X, ID=X, X, IG=X, X, and IH=X, X, person I is not classified into the existing group of persons A, B, D, G, and H. Since IA=O, X, IC=X, X, ID=X, X, IG=X, X, and IH=X, X, person I is not classified into the existing group of persons A, C, D, G, and H. Since IA=O, X, IE=O, X, and IF=O, X, persons A, E, F, and I are classified into the same group.

Subsequently, since AJ=X, O, persons A and J are classified into the same group. In this case, it is confirmed whether or not person J can be classified into the existing group of persons A, B, D, G, and H, the group of persons A, C, D, G, and H, and the group of persons A, E, F, and I. As a result, since JA=O, X, JB=O, X, JD=X, X, JG=X, X, and JH=X, X, person J is not classified into the existing group of persons A, B, D, G, and H. Since JA=O, X, JC=X, X, JD=X, X, JG=X, X, and JH=X, X, person J is not classified into the existing group of persons A, C, D, G, and H. Since JA=O, X, JE=O, X, JF=O, X, and JI=O, O, persons A, E, F, I, and J are classified into the same group.

Subsequently, since AK=X, O, persons A and K are classified into the same group. In this case, it is confirmed whether or not person K can be classified into the existing group of persons A, B, D, G, and H, the group of persons A, C, D, G, and H, and the group of persons A, E, F, I, and J. As a result, since KA=O, X, KB=O, X, KD=X, X, KG=X, X, and KH=X, X, person K is not classified into the existing group of persons A, B, D, G, and H. Since KA=O, X, KC=X, X, KD=X, X, KG=X, X, and KH=X, X, person K is not classified into the existing group of persons A, C, D, G, and H. Since KA=O, X, KE=X, X, KF=X, X, KI=X, X, and KJ=X, X, person K is not classified into the existing group of persons A, E, F, I, and J.

Subsequently, since AL=X, O, persons A and L are classified into the same group. In this case, it is confirmed whether or not person L can be classified into the existing group of persons A, B, D, G, and H, the group of persons A, C, D, G, and H, the group of persons A, E, F, I, and J, and the group of persons A and K. As a result, since LA=O, X, LB=O, X, LD=X, X, LG=X, X, and LH=X, X, person L is not classified into the existing group of persons A, B, D, G, and H. Since LA=O, X, LC=X, X, LD=X, X, LG=X, X, and LH=X, X, person L is not classified into the existing group of persons A, C, D, G, and H. Since LA=O, X, LE=X, X, LF=X, X, LI=X, X, and LJ=X, X, person L is not classified into the existing group of persons A, E, F, I, and J. Since LA=O, X and LK=O, O, persons A, K, and L are classified into the same group.

Subsequently, since AM=X, O, persons A and M are classified into the same group. In this case, it is confirmed whether or not person M can be classified into the existing group of persons A, B, D, G, and H, the group of persons A, C, D, G, and H, the group of persons A, E, F, I, and J, and the group of persons A, K, and L. As a result, since MA=O, X, MB=O, X, MD=X, X, MG=X, X, and MH=X, X, person M is not classified into the existing group of persons A, B, D, G, and H. Since MA=O, X, MC=X, X, MD=X, X, MG=X, X, and MH=X, X, person M is not classified into the existing group of persons A, C, D, G, and H. Since MA=O, X, ME=X, X, MF=X, X, MI=X, X, and MJ=X, X, person M is not classified into the existing group of persons A, E, F, I, and J. Since MA=O, X, MK=X, X, and ML=X, X, person M is not classified into the existing group of persons A, K, and L.

Subsequently, since AN=X, O, persons A and N are classified into the same group. In this case, it is confirmed whether or not person N can be classified into the existing group of persons A, B, D, G, and H, the group of persons A, C, D, G, and H, the group of persons A, E, F, I, and J, the group of persons A, K, and L, and the group of persons A and M. As a result, since NA=O, X, NB=O, X, ND=X, X, NG=X, X, and NH=X, X, person N is not classified into the existing group of persons A, B, D, G, and H. Since NA=O, X, NC=X, X, ND=X, X, NG=X, X, and NH=X, X, person N is not classified into the existing group of persons A, C, D, G, and H. Since NA=O, X, NE=X, X, NF=X, X, NI=X, X, and NJ=X, X, person N is not classified into the existing group of persons A, E, F, I, and J. Since NA=O, X, NK=X, X, and NL=X, X, person N is not classified into the existing group of persons A, K, and L. Since NA=O, X and NM=O, O, persons A, M, and N are classified into the same group.

Figure 5:
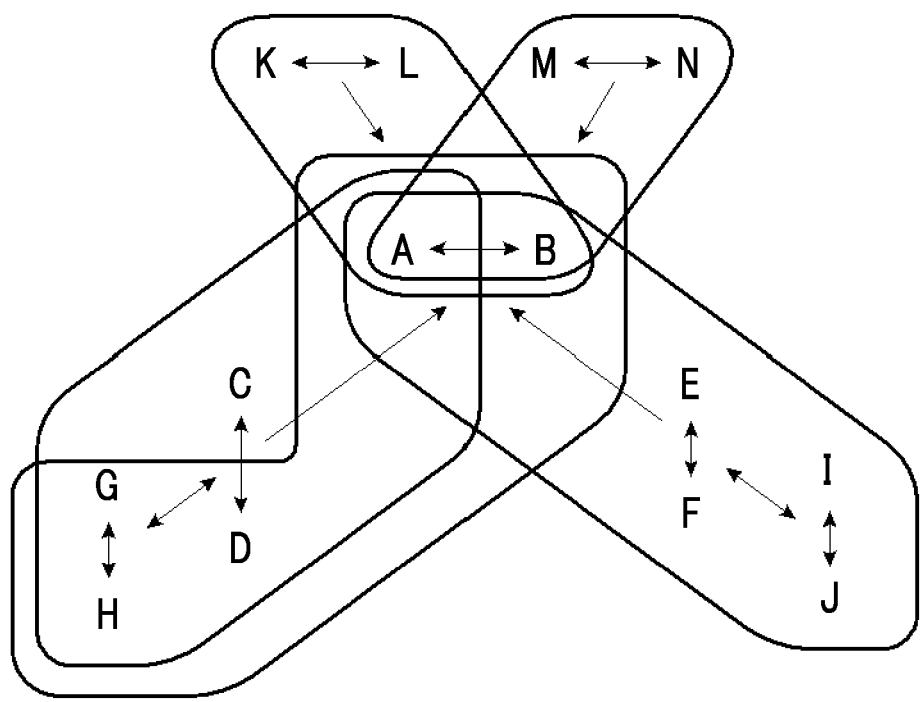
FIG. 5 is a conceptual diagram of an example showing a relationship between the plurality of persons classified into the level.

Similarly, persons B to N are also classified into groups. As a result, as shown in FIG. 5, persons A to N are classified into five groups including the group of persons A, B, D, G, and H, the group of persons A, C, D, G, and H, the group of persons A, E, F, I, and J, the group of persons A, B, K, and L, and the group of persons A, B, M, and N.

Subsequently, for example, the second threshold value is 0.09, and 14 persons A to N belonging to the first group are classified into levels.

Table 10 represents a difference (absolute value) between the standardized co-occurrence score of one permutation of two permutations of two persons and the standardized co-occurrence score of the other permutation.

TABLE 10

| | | | | | | |
|---|---|---|---|---|---|---|
| AB = 0.065 | | | | | | |
| AC = 0.250 | BC = 0.051 | | | | | |
| AD = 0.111 | BD = 0.103 | CD = 0.052 | | | | |
| AE = 0.111 | BE = 0.103 | CE = 0.035 | DE = 0.000 | | | |
| AF = 0.111 | BF = 0.103 | CF = 0.035 | DF = 0.000 | EF = 0.000 | | |
| AG = 0.118 | BG = 0.115 | CG = 0.092 | DG = 0.069 | EG = 0.019 | FG = 0.019 | |
| AH = 0.118 | BH = 0.115 | CH = 0.092 | DH = 0.069 | EH = 0.019 | FH = 0.019 | GH = 0.000 |
| AI = 0.118 | BI = 0.115 | CI = 0.025 | DI = 0.019 | EI = 0.069 | FI = 0.069 | GI = 0.000 |
| AJ = 0.118 | BJ = 0.115 | CJ = 0.025 | DJ = 0.019 | EJ = 0.069 | FJ = 0.069 | GJ = 0.000 |

TABLE 10-continued

| | | | | | | |
|---|---|---|---|---|---|---|
| AK = 0.188 | BK = 0.092 | CK = 0.018 | DK = 0.000 | EK = 0.000 | FK = 0.000 | GK = 0.019 |
| AL = 0.238 | BL = 0.103 | CL = 0.013 | DL = 0.007 | EL = 0.007 | FL = 0.007 | GL = 0.012 |
| AM = 0.108 | BM = 0.227 | CM = 0.013 | DM = 0.007 | EM = 0.007 | FM = 0.007 | GM = 0.012 |
| AN = 0.098 | BN = 0.175 | CN = 0.018 | DN = 0.000 | EN = 0.000 | FN = 0.000 | GN = 0.019 |

| | | | | | | |
|---|---|---|---|---|---|---|
| | HI = 0.000 | | | | | |
| | HJ = 0.000 | IJ = 0.000 | | | | |
| | HK = 0.019 | IK = 0.019 | JK = 0.019 | | | |
| | HL = 0.012 | IL = 0.012 | JL = 0.012 | KL = 0.075 | | |
| | HM = 0.012 | IM = 0.012 | JM = 0.012 | KM = 0.007 | LM = 0.000 | |
| | HN = 0.019 | IN = 0.019 | JN = 0.019 | KN = 0.000 | LN = 0.007 | MN = 0.075 |

In Table 10, for example, AB=0.065 represents that a difference (absolute value) between about 0.392 which is the standardized co-occurrence score of one permutation A×B of two persons A and B and about 0.475 which is the standardized co-occurrence score of the other permutation B×A is about 0.065.

For example, for the combination of two persons A and B, since both about 0.392 which is the standardized co-occurrence score of one permutation A×B of two permutations of persons A and B and about 0.475 which is the standardized co-occurrence score of the other permutation B×A are equal to or greater than 0.122 which is the first threshold value, about 0.065 which is a difference between about 0.392 which is the standardized co-occurrence score of one permutation A×B and about 0.475 which is the standardized co-occurrence score of the other permutation B×A is compared with 0.09 which is the second threshold value. Since about 0.065 which is the difference is less than 0.09 which is the second threshold value, two persons A and B are classified into the same level.

For the combination of two persons A and C, since both about 0.187 which is the standardized co-occurrence score of one permutation A×C of two permutations of persons A and C and about 0.437 which is the standardized co-occurrence score of the other permutation C×A are equal to or greater than 0.122 which is the first threshold value, about 0.250 which is the difference between about 0.187 which is the standardized co-occurrence score of one permutation A×C and about 0.437 which is the standardized co-occurrence score of the other permutation C×A is compared with 0.09 which is the second threshold value. Since about 0.250 which is the difference is equal to or greater than 0.09 which is the second threshold value, two persons A and C are classified into different levels.

Similarly, the difference between the standardized co-occurrence scores is compared with the second threshold value for each combination of two persons belonging to the group for each group, and the persons belonging to the group are classified into the levels.

As a result, as shown in FIG. 5, persons A and B among 14 persons A to N belonging to the first group are classified into the same level. Persons C, D, G, and H are classified into the same level, and persons E, F, I, and J are classified into the same level. Persons K and L are classified into the same level, and persons M and N are classified into the same level.

In FIG. 5, a bidirectional arrow represents that the difference between the standardized co-occurrence score of one permutation of two permutations of two persons and the standardized co-occurrence score of the other permutation at both sides of the arrow is less than 0.09 which is the second threshold value and two persons have the same level. Meanwhile, a unidirectional arrow represents that the difference is equal to or greater than 0.09 which is the second threshold value and two persons have different levels.

The unidirectional arrow points from a front person to a rear person in the permutation, of two permutations of two persons at both sides thereof, which has a larger standardized co-occurrence score. For example, in the case of persons A and C shown in Table 6, the unidirectional arrow points from front person C to rear person A in the permutation having a larger standardized co-occurrence score, of two permutations A×C and C×A of persons A and C, as shown in FIG. 5.

As stated above, in the present example, it is possible to classify the persons into the groups and the levels from the plurality of images.

For example, persons A (bride), B (groom), and K and L (both are bride's friends) forms one group as "friend group of bride". Persons A and B are classified into a level with which a likelihood of the key person (a likelihood of the main character) is high, and persons K and L are classified into a level with which the likelihood of the key person is low. Accordingly, it is possible to determine an actual human relationship in an event such as a wedding ceremony from the co-occurrence relation. The person having the level with which the likelihood of the key person is high corresponds to the specific person of the present invention in the same group.

An example of a method of using the human relationship determined as stated above will be described. Since persons K and L have the same level, all "images in which person K or L appear" are sent to persons K and L. Since persons A and B have the same level, all "images in which person A or B appears" are sent to persons A and B. Since persons A, B, K, and L belong to the same group, the images in which only persons K and L having a low likelihood of the key person appear and persons A and B having a high likelihood of the key person do not appear are sent to persons A and B having a high likelihood of the key person. Meanwhile, the image in which only persons A and B having a high likelihood of the key person appear and persons K and L having a low likelihood of the key person do not appear are not sent to persons K and L having a low likelihood of the key person.

Example 2

Table 11 represents names of images in an image set of a school trip and names of persons appearing in the images. In the image set of the school trip, in general, there is no key person among the plurality of persons. Table 11 to Table 17 correspond to Table 1 to Table 7, and thus, the description will not be simplified.

TABLE 11

|  | A | B | C | D | E | F | G | H | I | J | Number of person |
|---|---|---|---|---|---|---|---|---|---|---|---|
| Image 1 | 1 | 1 | 1 |  |  |  |  |  |  |  | 3 |
| Image 2 |  |  | 1 | 1 | 1 |  |  |  |  |  | 3 |
| Image 3 |  |  |  |  |  | 1 | 1 | 1 |  |  | 3 |
| Image 4 |  |  |  |  |  |  |  | 1 | 1 | 1 | 3 |

TABLE 11-continued

|  | A | B | C | D | E | F | G | H | I | J | Number of person |
|---|---|---|---|---|---|---|---|---|---|---|---|
| Image 5 | 1 | 1 |  |  |  |  |  |  |  |  | 2 |
| Image 6 |  |  | 1 | 1 | 1 |  |  |  |  |  | 3 |
| Image 7 |  |  |  |  |  | 1 | 1 |  |  |  | 2 |
| Image 8 |  |  |  |  |  |  |  | 1 | 1 | 1 | 3 |
| Image 9 | 1 | 1 |  | 1 |  |  |  |  |  |  | 3 |
| Image 10 |  |  |  |  |  | 1 |  |  | 1 | 1 | 3 |
| Number of times of appearances | 3 | 3 | 3 | 3 | 2 | 3 | 2 | 3 | 3 | 3 | 28 |
| Number of times of appearances per image | 0.3 | 0.3 | 0.3 | 0.3 | 0.2 | 0.3 | 0.2 | 0.3 | 0.3 | 0.3 | 2.8 |

The names of the images are represented in the second to eleventh rows from an upper side in a left-end column of Table 11. The names of the images are images 1 to 10, and the total number of images in the image set is 10. The names of the persons are represented in the second to eleventh columns from a left side in the uppermost row of Table 11. The names of the persons are A to J, and the total number of persons is 10.

A flag indicating whether or not the person appears in the image is represented as the co-occurrence relation information in each of the second to eleventh rows from the upper side and the second to eleventh columns from the left side of Table 11. The number of times of appearances of each person in the image set is represented in each of the second to eleventh columns from the left side in the second row from the lower side of Table 11, and the number of times of appearances of each person per image is represented in each of the second to eleventh columns from the left side in the last row of Table 11. For example, the number of times of appearances of person A in the image set is 3, and the number of times of appearances of person A per image is 3/10=0.3.

The number of persons appearing in each image is represented in each of the second to eleventh rows from the upper side in the right-end column of Table 11. The total number of times of appearances of the person in the image set is represented in the second row from the lower side in the right-end column of Table 11, and the number of times of appearances of the person per image is represented in the last column of the right-end row of Table 11. The total number of times of appearances of the person in the image set is 28, and the number of times of appearances of the person per image is 28/10=2.8.

Subsequently, Table 12 represents the co-occurrence scores of the permutations of person A and persons A to N.

TABLE 12

|  | A × A | A × B | A × C | A × D | A × E | A × F | A × G | A × H | A × I | A × J |
|---|---|---|---|---|---|---|---|---|---|---|
| Image 1 | 0.5 | 0.5 | 0.5 | 0 | 0 | 0 | 0 | 0 | 0 | 0 |
| Image 2 | 0 | 0 | 0 | 0 | 0 | 0 | 0 | 0 | 0 | 0 |
| Image 3 | 0 | 0 | 0 | 0 | 0 | 0 | 0 | 0 | 0 | 0 |
| Image 4 | 0 | 0 | 0 | 0 | 0 | 0 | 0 | 0 | 0 | 0 |
| Image 5 | 1 | 1 | 0 | 0 | 0 | 0 | 0 | 0 | 0 | 0 |
| Image 6 | 0 | 0 | 0 | 0 | 0 | 0 | 0 | 0 | 0 | 0 |
| Image 7 | 0 | 0 | 0 | 0 | 0 | 0 | 0 | 0 | 0 | 0 |
| Image 8 | 0 | 0 | 0 | 0 | 0 | 0 | 0 | 0 | 0 | 0 |
| Image 9 | 0.5 | 0.5 | 0 | 0.5 | 0 | 0 | 0 | 0 | 0 | 0 |
| Image 10 | 0 | 0 | 0 | 0 | 0 | 0 | 0 | 0 | 0 | 0 |
|  | 2 | 2 | 0.5 | 0.5 | 0 | 0 | 0 | 0 | 0 | 0 |

Similarly to Table 11, the names of the images are represented in the second to eleventh rows from the upper side of the left-end column of Table 12. The names of permutations A×A, A×B, A×C, A×D, A×E, A×F, A×G, A×H, A×I, and A×J of person A and persons A and N are represented in the second to eleventh columns from the left side in the uppermost row of Table 12.

For example, the co-occurrence score of the permutation A×B of person A and person B in each image is represented in each of the second to eleventh rows of the third column from the left side of Table 12. The co-occurrence score of the permutation A×B of person A and person B in the image set is represented in the last row of the third column from the left side of Table 12. The co-occurrence score of the permutation A×B of person A and person B in the image set is 0.5+0+0+0+1+0+0+0+0.5+0=2.

It is possible to similarly calculate the co-occurrence scores of permutations of two persons other than the permutations of person A and persons B to J.

Subsequently, Table 13 represents the co-occurrence scores in the image set.

TABLE 13

|  | A | B | C | D | E | F | G | H | I | J |
|---|---|---|---|---|---|---|---|---|---|---|
| A |  | 2 | 0.5 | 0.5 | 0 | 0 | 0 | 0 | 0 | 0 |
| B | 2 |  | 0.5 | 0.5 | 0 | 0 | 0 | 0 | 0 | 0 |
| C | 0.5 | 0.5 |  | 1 | 1 | 0 | 0 | 0 | 0 | 0 |
| D | 0.5 | 0.5 | 1 |  | 1 | 0 | 0 | 0 | 0 | 0 |
| E | 0 | 0 | 1 | 1 |  | 0 | 0 | 0 | 0 | 0 |
| F | 0 | 0 | 0 | 0 | 0 |  | 1.5 | 0.5 | 0.5 | 0.5 |
| G | 0 | 0 | 0 | 0 | 0 | 1.5 |  | 0.5 | 0 | 0 |
| H | 0 | 0 | 0 | 0 | 0 | 0.5 | 0.5 |  | 1 | 1 |
| I | 0 | 0 | 0 | 0 | 0 | 0.5 | 0 | 1 |  | 1.5 |
| J | 0 | 0 | 0 | 0 | 0 | 0.5 | 0 | 1 | 1.5 |  |
| Number of images | 3 | 3 | 3 | 3 | 2 | 3 | 2 | 3 | 3 | 3 |

Names A to J of persons are represented in the second to eleventh columns from the left side in the uppermost row of Table 13. Similarly, the names A to J of the persons are represented in the second to eleventh rows from the upper side of the left-end column of Table 13.

The co-occurrence scores in the image set are represented in the second to eleventh rows from the upper side and the second to eleventh columns from the left side of Table 13. For example, the co-occurrence score of the permutation of person A and person B in the image set is two as represented in the last row in the third column from the left side of Table 12. In Table 13, the co-occurrence score of the permutation of the same person is excluded. The number of images in which each person appears in the image set is represented in each of the second to eleventh columns from the left side in the last row of Table 13. For example, the number of images in which person A appears in the image set is three as represented in the second row from the lower side in the second column from the left side of Table 11.

Subsequently, in Table 14 and Table 15, the maximum values of the co-occurrence scores of the plurality of persons in the image set are sorted in descending order and the co-occurrence scores of persons other than each person in the image set are sorted for each person in descending order based on the co-occurrence scores of Table 13.

TABLE 14

|  | A |  | B |  | F |  | G |  | I |
|---|---|---|---|---|---|---|---|---|---|
| B | 2 | A | 2 | G | 1.5 | F | 1.5 | J | 1.5 |
| C | 0.5 | C | 0.5 | H | 0.5 | H | 0.5 | H | 1 |
| D | 0.5 | D | 0.5 | I | 0.5 | A | 0 | F | 0.5 |
| E | 0 | E | 0 | J | 0.5 | B | 0 | A | 0 |
| F | 0 | F | 0 | A | 0 | C | 0 | B | 0 |
| G | 0 | G | 0 | B | 0 | D | 0 | C | 0 |
| H | 0 | H | 0 | C | 0 | E | 0 | D | 0 |
| I | 0 | I | 0 | D | 0 | I | 0 | E | 0 |
| J | 0 | J | 0 | E | 0 | J | 0 | G | 0 |
| Total | 3 |  | 3 |  | 3 |  | 2 |  | 3 |

TABLE 15

|  | J |  | C |  | D |  | E |  | H |
|---|---|---|---|---|---|---|---|---|---|
| I | 1.5 | D | 1 | C | 1 | C | 1 | I | 1 |
| H | 1 | E | 1 | E | 1 | D | 1 | J | 1 |
| F | 0.5 | A | 0.5 | A | 0.5 | A | 0 | F | 0.5 |
| A | 0 | B | 0.5 | B | 0.5 | B | 0 | G | 0.5 |
| B | 0 | F | 0 | F | 0 | F | 0 | A | 0 |
| C | 0 | G | 0 | G | 0 | G | 0 | B | 0 |
| D | 0 | H | 0 | H | 0 | H | 0 | C | 0 |
| E | 0 | I | 0 | I | 0 | I | 0 | D | 0 |
| G | 0 | J | 0 | J | 0 | J | 0 | E | 0 |
| Total | 3 |  | 3 |  | 3 |  | 2 |  | 3 |

Names of persons are represented in even-numbered columns of the uppermost rows of Table 14 and Table 15 from the left side in order of the person with a large maximum value of the co-occurrence scores in the image set. The names of the persons are A, B, F, G, I, J, C, D, E, and H from the left side.

For example, the left-end column and the second column from the left side of Table 14 represent the co-occurrence scores of the permutations of person A and persons B to J in the image set. The co-occurrence scores of the permutations of person A and persons B to J in the image set are represented in the second column from the left side of Table 14 from the upper side in descending order. The names of persons B to J other than person A are represented in the left-end column of Table 14 from the upper side in order of the person with a large co-occurrence score in the image set.

The total values of the co-occurrence scores in the image set are represented in the even-numbered columns of the last rows of Table 14 and Table 15. For example, the total value of the co-occurrence scores of the permutations of person A and persons B to J in the image set is 3 as represented in the second column from the left side in the last row of Table 14.

Subsequently, Table 16 and Table 17 represent the standardized co-occurrence scores by dividing the co-occurrence scores of Table 13 and Table 14 by the total values of the co-occurrence scores of the persons.

TABLE 16

|  | A |  | B |  | F |  | G |  | I |
|---|---|---|---|---|---|---|---|---|---|
| B | 0.667 | A | 0.667 | G | 0.5 | F | 0.75 | J | 0.5 |
| C | 0.167 | C | 0.167 | H | 0.167 | H | 0.25 | H | 0.333 |
| D | 0.167 | D | 0.167 | I | 0.167 | A | 0 | F | 0.167 |
| E | 0 | E | 0 | J | 0.167 | B | 0 | A | 0 |
| F | 0 | F | 0 | A | 0 | C | 0 | B | 0 |
| G | 0 | G | 0 | B | 0 | D | 0 | C | 0 |
| H | 0 | H | 0 | C | 0 | E | 0 | D | 0 |
| I | 0 | I | 0 | D | 0 | I | 0 | E | 0 |
| J | 0 | J | 0 | E | 0 | J | 0 | G | 0 |
| Total | 1 |  | 1 |  | 1 |  | 1 |  | 1 |

TABLE 17

|  | J |  | C |  | D |  | E |  | H |
|---|---|---|---|---|---|---|---|---|---|
| I | 0.5 | D | 0.333 | C | 0.333 | C | 0.5 | I | 0.333 |
| H | 0.333 | E | 0.333 | E | 0.333 | D | 0.5 | J | 0.333 |
| F | 0.167 | A | 0.167 | A | 0.167 | A | 0 | F | 0.167 |
| A | 0 | B | 0.167 | B | 0.167 | B | 0 | G | 0.167 |
| B | 0 | F | 0 | F | 0 | F | 0 | A | 0 |
| C | 0 | G | 0 | G | 0 | G | 0 | B | 0 |
| D | 0 | H | 0 | H | 0 | H | 0 | C | 0 |
| E | 0 | I | 0 | I | 0 | I | 0 | D | 0 |
| G | 0 | J | 0 | J | 0 | J | 0 | E | 0 |
| Total | 1 |  | 1 |  | 1 |  | 1 |  | 1 |

For example, the standardized co-occurrence scores of the permutations of person A and persons B to J are represented in the second column from the left side of Table 16 in descending order. The standardized co-occurrence score of the permutation of person A and person B is ⅔=about 0.667, and the standardized co-occurrence score of the permutation of person B and person A is ⅔=about 0.667.

Subsequently, similarly, the first threshold value is 0.185, and 10 persons A to J are classified into the groups.

Table 18 and Table 19 represent results of comparing the standardized co-occurrence scores of two permutations of two persons including each person and another person other than each person with the first threshold value.

TABLE 18

| AB = O, O | BA = O, O | CA = X, X | DA = X, X | EA = X, X |
| AC = X, X | BC = X, X | CB = X, X | DB = X, X | EB = X, X |
| AD = X, X | BD = X, X | CD = O, O | DC = O, O | EC = O, O |
| AE = X, X | BE = X, X | CE = O, O | DE = O, O | ED = O, O |
| AF = X, X | BF = X, X | CF = X, X | DF = X, X | EF = X, X |
| AG = X, X | BG = X, X | CG = X, X | DG = X, X | EG = X, X |
| AH = X, X | BH = X, X | CH = X, X | DH = X, X | EH = X, X |
| AI = X, X | BI = X, X | CI = X, X | DI = X, X | EI = X, X |
| AJ = X, X | BJ = X, X | CJ = X, X | DJ = X, X | EJ = X, X |

TABLE 19

| FA = X, X | GA = X, X | HA = X, X | IA = X, X | JA = X, X |
| FB = X, X | GB = X, X | HB = X, X | IB = X, X | JB = X, X |
| FC = X, X | GC = X, X | HC = X, X | IC = X, X | JC = X, X |

TABLE 19-continued

| | | | | |
|---|---|---|---|---|
| FD = X, X | GD = X, X | HD = X, X | ID = X, X | JD = X, X |
| FE = X, X | GE = X, X | HE = X, X | IE = X, X | JE = X, X |
| FG = O, O | GF = O, O | HF = X, X | IF = X, X | JF = X, X |
| FH = X, X | GH = O, X | HG = X, O | IG = X, X | JG = X, X |
| FI = X, X | GI = X, X | HI = O, O | IH = O, O | JH = O, O |
| FJ = X, X | GJ = X, X | HJ = O, O | IJ = O, O | JI = O, O |

For person A, initially, since AB=O, O, persons A and B are classified into the same group.

Subsequently, since AC=X, X, persons A and C are classified into different groups. In this case, since person C is not classified into the same existing group of persons A and B, it is not necessary to confirm whether or not the person C can be classified into the same existing group of persons A and B.

Subsequently, since AD=X, X, persons A and D are classified into different groups. In this case, since person D is not classified into the existing group of persons A and B, it is confirmed whether or not person D can be classified into the existing group of person C. As a result, since CD=O, O, persons C and D are classified into the same group.

Subsequently, since AE=X, X, persons A and E are classified into different groups. In this case, since person E is not classified into the existing group of persons A and B, it is confirmed whether or not person E can be classified into the existing group of persons C and D. As a result, since CE=O, O and DE=O, O, persons C, D, and E are classified into the same group.

Subsequently, since AF=X, X, persons A and F are classified into different groups. In this case, since person F is not classified into the existing group of persons A and B, it is confirmed whether or not person F can be classified into the existing group of persons C, D, and E. As a result, since CF=X, X, DF=X, X, and EF=X, X, person F is not classified into the existing group of persons C, D, and E. Person F is classified into a group different from the existing group of persons A and B and the group of persons C, D, and E.

Subsequently, since AG=X, X, persons A and G are classified into different groups. In this case, since person G is not classified into the existing group of persons A and B, it is confirmed whether or not person G can be classified into the existing group of persons C, D, and E and the group of person F. As a result, since CG=X, X, DG=X, X, and EG=X, X, person G is not classified into the existing group of persons C, D, and E. Since FG=O, O, persons F and G are classified into the same group.

Subsequently, since AH=X, X, persons A and H are classified into different groups. In this case, since person H is not classified into the existing group of persons A and B, it is confirmed whether or not person H can be classified into the existing group of persons C, D, and E and the group of persons F and G. As a result, since CH=X, X, DH=X, X, and EH=X, X, person H is not classified into the existing group of persons C, D, and E. Since FH=X, X and GH=O, X, person H is not classified into the existing group of persons F and G. Since GH=O, X, persons G and H are classified into the same group.

Subsequently, since AI=X, X, persons A and I are classified into different groups. In this case, since person I is not classified into the existing group of persons A and B, it is confirmed whether or not person I can be classified into the existing group of persons C, D, and E, the group of persons F and G, and the group of persons G and H. As a result, since CI=X, X, DI=X, X, and EI=X, X, person I is not classified into the existing group of persons C, D, and E. Since FI=X, X and GI=X, X, person I is not classified into the existing group of persons F and G. Since GI=X, X and HI=O, O, person I is not classified into the existing group of persons G and H. Since HI=O, O, persons H and I are classified into the same group.

Subsequently, since AJ=X, X, persons A and J are classified into different groups. In this case, since person J is not classified into the existing group of persons A and B, it is confirmed whether or not person J can be classified into the existing group of persons C, D, and E, the group of persons F and G, the group of persons G and H, and the group of persons H and I. As a result, since CJ=X, X, DJ=X, X, and EJ=X, X, person J is not classified into the existing group of persons C, D, and E. Since FJ=X, X and GJ=X, X, person J is not classified into the existing group of persons F and G. Since GJ=X, X and HJ=O, O, person J is not classified into the existing group of persons G and H. Since HJ=O, O and IJ=O, O, persons H, I, and J are classified into the same group.

Figure 6:
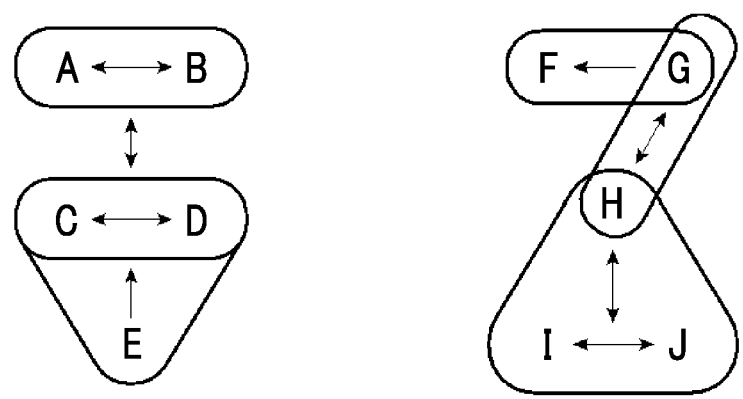
FIG. 6 is a conceptual diagram of an example showing a relationship between the plurality of persons classified into the group.

Similarly, persons B to J are also classified into groups. As a result, as shown in FIG. 6, persons A to J are classified into five groups including a group of persons A and B, a group of persons C, D, and E, a group of persons F and G, a group of persons G and H, and a group of persons H, I, and J.

Subsequently, for example, the second threshold value is 0.1, and two persons A and B belonging to a first group are classified into levels as in the case of FIG. 5. For three persons C, D, and E belonging to a second group, two persons F and G belonging to a third group, two persons G and H belonging to a fourth group, and three persons H, I, and J belonging to a fifth group, the difference between the standardized co-occurrence scores is compared with the second threshold value for each combination of two persons belonging to the group, and the persons belonging to the group are further classified into the levels.

Table 20 represents the difference (absolute value) between the standardized co-occurrence score of one permutation of two permutations of two persons and the standardized co-occurrence score of the other permutation.

TABLE 20

| | | | | | | | | |
|---|---|---|---|---|---|---|---|---|
| AB = 0.000 | | | | | | | | |
| AC = 0.000 | BC = 0.000 | | | | | | | |
| AD = 0.000 | BD = 0.000 | CD = 0.000 | | | | | | |
| AE = 0.000 | BE = 0.000 | CE = 0.167 | DE = 0.167 | | | | | |
| AF = 0.000 | BF = 0.000 | GF = 0.000 | DF = 0.000 | EF = 0.000 | | | | |
| AG = 0.000 | BG = 0.000 | CG = 0.000 | DG = 0.000 | EG = 0.000 | FG = 0.250 | | | |
| AH = 0.000 | BH = 0.000 | CH = 0.000 | DH = 0.000 | EH = 0.000 | FH = 0.000 | GH = 0.083 | | |
| AI = 0.000 | BI = 0.000 | CI = 0.000 | DI = 0.000 | EI = 0.000 | FI = 0.000 | GI = 0.000 | HI = 0.000 | |
| AJ = 0.000 | BJ = 0.000 | CJ = 0.000 | DJ = 0.000 | EJ = 0.000 | FJ = 0.000 | GJ = 0.000 | HJ = 0.000 | IJ = 0.000 |

As a result, as shown in FIG. 6, two persons A and B belonging to the first group are classified into the same levels. Among three persons belonging to the second group, persons C and D are classified into the same level, and persons C and D and person E are classified into different levels. Two persons F and G belonging to the third group are classified into different levels. Two persons G and H belonging to the fourth group are classified into the same level. Three persons H, I, and J belonging to the fifth group are classified into the same level.

Similarly to the case of FIG. 5, bidirectional and unidirectional arrows in FIG. 6 represent that in a case where the second threshold value is 0.1, the difference between the standardized co-occurrence score of one permutation of two permutations of two persons at both side of the arrow and the standardized co-occurrence score of the other permutation is less than 0.1 which is the second threshold value and these two persons have the same level or the difference is equal to or greater than 0.1 which is the second threshold value and these two persons have different levels.

As stated above, in the present example, it is possible to classify the persons into the groups and the levels from the plurality of images.

For example, persons A and B form one group. Persons C, D, and E form one group, persons C and D are classified into a level with which the likelihood of the key person is high, and person E is classified into a level with which the likelihood of the key person is low. It is possible to determine different groups of the group formed by persons A and B and the group formed by persons C, D, and E. This determination matches a human relationship capable of being determined by a natural person who sees the images of Table 11. That is, the determination of forming different groups according to the present example matches the human relation capable of being understood by the natural person that since "person A, person B, and person C in image 1 have the co-occurrence relation and persons A and B and person D in image 9 have the co-occurrence relation but there are no images having co-occurrence relation in other images, persons C and D having the co-occurrence relation in the image in which persons A and B appear merely appear (for example, persons C and D are merely in the same class and travel around the same tourist spot)".

An example of a method of using the human relationship determined as stated above will be described. Since persons A and B have the same level, all "images in which person A or B appears" are sent to persons A and B. Since persons C and D have the same level, all "images in which person C or D appears" are sent to persons C and D. All "images in which person E appears" are sent to person E. Since persons C, D, and E belong to the same group, the images in which only person E having a low likelihood of the key person appears and persons C and D having a high likelihood of the key person do not appear are sent to persons C and D having a high likelihood of the key person. Meanwhile, the images in which only persons C and D having a high likelihood of the key person appear and person E having a low likelihood of the key person does not appear are not sent to person E having a low likelihood of the key person.

The method of setting the first threshold value is not particularly limited. For example, 0.1 is set as the first threshold value for the standardized co-occurrence score. In this manner, a single fixed value (initial value) may be set as the first threshold value in the image processing device 10.

Even though the co-occurrence relation and the standardized co-occurrence scores of the plurality of persons in the image set are obtained, in order not to unconditionally classify the persons such that the persons are friends in a case where these persons have such a relationship in a real society and the persons are not friends in a case where these persons do not have such a relationship, a threshold value of the standardized co-occurrence score for determining whether or not the persons are regarded as the same group may be appropriately determined by the user instead of being determined by the image processing device 10.

Accordingly, as stated above, the first threshold value may be set (changed) according to the command of the user. For example, the command receiving unit 22 may comprise a box (input field) for directly inputting the first threshold value. Alternatively, the command receiving unit 22 includes a slider bar. For example, an initial value of the first threshold value is set as 0.1. However, the user moves the slider bar, and thus, the first threshold value may be changed by, for example, increments of 0.01.

For example, it is assumed that each person is expressed by a representative face image and the plurality of groups is distinguishably displayed by surrounding and separating the representative face images by lines. In this case, in a case where the user changes the first threshold value by inputting the first threshold value in the box or moving the slider bar, the classification of the persons into the groups is changed and displayed based on the changed first threshold value. Accordingly, the user easily performs desired group classification.

In a case where the first threshold value is set as zero, the plurality of persons is classified into a single group. Meanwhile, in a case where the first threshold value is set as one, the person is classified into a one-person group to which only the person belongs for each person except for a case where there is only a two-shot image with a certain person. The plurality of persons appears in the image sets of the wedding reception and the school trip. However, it is normal that there is a group of persons having high closeness to some extent, and the user easily performs desired group classification by moving the slider bar.

Alternatively, it is possible to calculate the first threshold value or the initial thereof based on the image set. For example, the closeness of two persons on the assumption that these two persons have an average co-occurrence relation is calculated, and the calculated closeness is set as the first threshold value or the initial value thereof. In a case where actual closeness (standardized co-occurrence score) of two persons is equal to or greater than the first threshold value, it is assumed that these two persons belong to the same group.

Specifically, the first threshold value can be calculated by 1/(average number of persons having co-occurrence relation)=1/{(total number of persons appearing in image set+ number of times of appearances of person per image in image set)/2−1}. For example, the first threshold value is 1/{(14+4.4/2−1}=about 0.122 in the image set of Example 1, and the first threshold value is 1/{(10+2.8)/2−1}=about 0.185 in the image set of Example 2.

A single fixed value in the image processing device 10 may be set as the calculated first threshold value, or may be set as an initial value of the first threshold value. The first threshold value may be changed by the slider bar. The plurality of persons may be classified into the groups after processing is performed such that the first threshold value of Example 1 is 0.1 and the first threshold value of Example 2 is 0.2 by rounding off the first threshold value calculated by the calculation as stated above in order to simplify the calculation.

Similarly to the case of the first threshold value, the second threshold value can be set. That is, a single fixed value in the image processing device 10 may be set as the second threshold value, or the second threshold value may be set (changed) according to the command of the user. The second threshold value or the initial value thereof may be calculated by 1/{(total number of persons appearing in image set+number of times of appearances of persons per image in image set)/2−1} of the aforementioned calculation expression.

In the image processing device 10 according to the embodiment of the present invention, the co-occurrence relation storage unit 16 is constituted by, for example, a memory such as a semiconductor memory. A hardware configuration of a processing unit that performs various processing of the image set receiving unit 12, the person determining unit 14, the co-occurrence score calculating unit 18, the person classifying unit 20, the command receiving unit 22, the person display unit 24, the image specifying unit 26, the person specifying unit 28, and the image selecting unit 30 may be dedicated hardware, or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing device
12: image set receiving unit
14: person determining unit
16: co-occurrence relation storage unit
18: co-occurrence score calculating unit
20: person classifying unit
22: command receiving unit
24: person display unit
26: image specifying unit
28: person specifying unit
30: image selecting unit

What is claimed is:

1. An image processing device comprising:
an image set receiving unit that receives an input of an image set;
a person determining unit that determines a plurality of persons appearing in the image set;
a co-occurrence relation storage unit that stores co-occurrence relation information indicating that two or more persons of the plurality of persons have a co-occurrence relation in an image in a case where the two or more persons appear in the image based on a determination result of the plurality of persons using the person determining unit for each image included in the image set;
a co-occurrence score calculating unit that calculates a co-occurrence score indicating strength of the co-occurrence relation of two persons in the image set based on all the co-occurrence relation information items in the image for each permutation of the two persons of the plurality of persons; and
a person classifying unit that classifies at least a part of the plurality of persons into groups based on all the co-occurrence scores of the permutations of the two persons in the image set, wherein the co-occurrence score calculating unit
calculates the co-occurrence scores of the permutations of the two persons in the image for each image based on a number of persons appearing in the image, and
calculates the co-occurrence scores of the permutations of the two persons in the image set based on all the co-occurrence scores of the permutations of the two persons in the image,
wherein the co-occurrence score calculating unit
calculates the co-occurrence scores of the permutations of the two persons in the image by 1/(n−1) for each image in a case where n persons including the two persons appears in the image, in which n is an integer of 2 or more,
sets the co-occurrence scores of the permutations of the two persons in the image as zero in a case where the two persons do not appear in the image, and
calculates the co-occurrence scores of the permutations of the two persons in the image set by adding all the co-occurrence scores of the permutations of the two persons in the image.

2. The image processing device according to claim 1, wherein
the co-occurrence relation storage unit stores, as the co-occurrence relation information, a flag indicating whether or not each of the plurality of persons appears in the image, for each image.

3. The image processing device according to claim 1, wherein the person classifying unit
calculates, for each person included in the plurality of persons, a total value of the co-occurrence scores of the person by adding all the co-occurrence scores of the permutations of the two persons including the person and each of persons other than the person in the image set,
standardizes the co-occurrence scores by dividing each of the co-occurrence scores of the permutations of the two persons including the person and each of persons other than the person in the image set by the total value of the co-occurrence scores of the person for each person, and classifies the plurality of persons into the groups based on all the standardized co-occurrence scores of the permutations of the two persons including the person and each of persons other than the person.

4. The image processing device according to claim 3, wherein the person classifying unit compares the standardized co-occurrence scores of two permutations of first two persons including the person and each of persons other than the person with a first threshold value for each person, and classifies the first two persons into a same group in a case where the standardized co-occurrence score of at least one of the two permutations of the first two persons is equal to or greater than the first threshold value whenever the standardized co-occurrence scores of the two permutations of the first two persons are compared with the first threshold value, classifies the first two persons into different groups in a case where the standardized co-occurrence scores of both the two permutations of the first two persons are less than the first threshold value, and confirms whether or not the first two persons are able to be classified into an existing group, and wherein in a case where the person classifying unit confirms whether or not the first two persons are able to be classified into the existing group, the person classifying unit compares the standardized co-occurrence scores of two permutations of second two persons including the person and each person belonging to the existing group with the first threshold value for each person included in the first two person, and classifies the second two persons and the person belonging to the existing group into a same group in a case where the standardized co-occurrence score of at least one of the two permutations of all the second two persons is equal to or greater than the first threshold value, and classifies the second two persons into a group different from the person belonging to the existing group in a case where there are the second two persons for which the standardized co-occurrence scores of both the two permutations are less than the first threshold value among all the second two persons.

5. The image processing device according to claim 4, wherein the person classifying unit compares the standardized co-occurrence scores of the two permutations of the first two persons including the person and each of persons other than the person with the first threshold value for each person in order of the person for which a maximum value of the co-occurrence scores is larger, and sets the existing group as a first group, and classifies the second two persons into a second group including the person belonging to the first group in a case where the standardized co-occurrence score of at least one of the two permutations of the second two persons is equal to or greater than the first threshold value for all the second two persons.

6. The image processing device according to claim 5, wherein the person classifying unit repeats the setting of the existing group into the first group and the classifying of the second two persons into the second group including the person belonging to the first group by twice or more.

7. The image processing device according to claim 4, wherein the person classifying unit classifies two persons of each combination belonging to the group into levels based on the standardized co-occurrence scores of two permutations of the two persons of the combination for each combination of the two persons belonging to the group for each group.

8. The image processing device according to claim 7, wherein the person classifying unit compares a difference between the standardized co-occurrence score of one permutation of the two permutations of the two persons of the combination and the standardized co-occurrence score of the other permutation with a second threshold value in a case where the standardized co-occurrence score of at least one permutation of the two permutations of the two persons of the combination is equal to or greater than the first threshold value, classifies the two persons of the combination into different levels in a case where the difference is equal to or greater than the second threshold value, and classifies the two persons of the combination into a same level in a case where the difference is less than the second threshold value.

9. The image processing device according to claim 4, wherein the first threshold value is calculated by 1/{(total number of persons appearing in the image set+number of times of appearances of person per image in the image set)/2−1}.

10. The image processing device according to claim 8, wherein the second threshold value is calculated by 1/{total number of persons appearing in the image set+number of times of appearances of person per image in the image set}/2−1}.

11. The image processing device according to claim 1, further comprising:

an image specifying unit that specifies an image in which one or more persons belonging to the group appear from the image set for each group;

a person specifying unit that specifies, as specific persons, one or more persons satisfying a predetermined condition among the plurality of persons; and an image selecting unit that selects a part of the images based on whether or not the specific persons appear in an image from among the images in which one or more persons belonging to the group appear for each group.

12. The image processing device according to claim 11, wherein the image selecting unit selects an image in which at least one person of the specific persons and at least one person which belongs to the group and is other than the specific persons appear together, an image in which at least one person which belongs to the group and is other than the specific persons appears, and a part of images, which satisfies a predetermined condition, of an image in which at least one person of the specific persons appears and an image in which at least one person of the specific persons and at least one person which does not belong to the group appear together, among the images in which one or more persons belonging to the group appear.

13. An image processing method comprising:
receiving, by an image set receiving unit, an input of an image set;
determining, by a person determining unit, a plurality of persons appearing in the image set;
storing, by a co-occurrence relation storage unit, co-occurrence relation information indicating that two or more persons of the plurality of persons have a co-occurrence relation in an image in a case where the two or more persons appear in the image based on a determination result of the plurality of persons using the person determining unit for each image included in the image set;
calculating, by a co-occurrence score calculating unit, a co-occurrence score indicating strength of the co-occurrence relation of two persons in the image set based on all the co-occurrence relation information items in the image for each permutation of the two persons of the plurality of persons; and
classifying, by a person classifying unit, at least a part of the plurality of persons into groups based on all the co-occurrence scores of the permutations of the two persons in the image set, wherein
the co-occurrence scores of the permutations of the two persons in the image for each image are calculated based on a number of persons appearing in the image, and
the co-occurrence scores of the permutations of the two persons in the image set are calculated based on all the co-occurrence scores of the permutations of the two persons in the image,
wherein the co-occurrence score calculating unit calculates the co-occurrence scores of the permutations of the two persons in the image by $1/(n-1)$ for each image in a case where n persons including the two persons appears in the image, in which n is an integer of 2 or more,
sets the co-occurrence scores of the permutations of the two persons in the image as zero in a case where the two persons do not appear in the image, and
calculates the co-occurrence scores of the permutations of the two persons in the image set by adding all the co-occurrence scores of the permutations of the two persons in the image.

14. The image processing method according to claim 13, wherein the classifying of at least a part of the plurality of persons into the groups includes
calculating, for each person included in the plurality of persons, a total value of the co-occurrence scores of the person by adding all the co-occurrence scores of the permutations of the two persons including the person and each of persons other than the person in the image set,
standardizing the co-occurrence scores by dividing each of the co-occurrence scores of the permutations of the two persons including the person and each of persons other than the person in the image set by the total value of the co-occurrence scores of the person for each person, and
classifying the plurality of persons into the groups based on all the standardized co-occurrence scores of the permutations of the two persons including the person and each of persons other than the person.

15. The image processing method according to claim 14, wherein the classifying of at least a part of the plurality of persons into the groups includes
comparing the standardized co-occurrence scores of two permutations of first two persons including the person and each of persons other than the person with a first threshold value for each person, and
classifying the first two persons into a same group in a case where the standardized co-occurrence score of at least one of the two permutations of the first two persons is equal to or greater than the first threshold value whenever the standardized co-occurrence scores of the two permutations of the first two persons are compared with the first threshold value, classifying the first two persons into different groups in a case where the standardized co-occurrence scores of both the two permutations of the first two persons are less than the first threshold value, and confirming whether or not the first two persons are able to be classified into an existing group, and
wherein confirming whether or not the first two persons are able to be classified into the existing group includes
comparing the standardized co-occurrence scores of two permutations of second two persons including the person and each person belonging to the existing group with the first threshold value for each person included in the first two person, and
classifying the second two persons and the person belonging to the existing group into a same group in a case where the standardized co-occurrence score of at least one of the two permutations of all the second two persons is equal to or greater than the first threshold value, and
classifying the second two persons into a group different from the person belonging to the existing group in a case where there are the second two persons for which the standardized co-occurrence scores of both the two permutations are less than the first threshold value among all the second two persons.

16. The image processing method according to claim 15, wherein, in the classifying of at least a part of the plurality of persons into the groups,
two persons of each combination belonging to the group are classified into levels based on the standardized co-occurrence scores of two permutations of the two persons of the combination for each combination of the two persons belonging to the group for each group.

17. The image processing method according to claim 16, wherein, in the classifying of at least a part of the plurality of persons into the groups,
a difference between the standardized co-occurrence score of one permutation of the two permutations of the two persons of the combination and the standardized co-occurrence score of the other permutation is compared with a second threshold value in a case where the standardized co-occurrence score of at least one permutation of the two permutations of the two persons of the combination is equal to or greater than the first threshold value,
the two persons of the combination are classified into different levels in a case where the difference is equal to or greater than the second threshold value, and
the two persons of the combination are classified into a same level in a case where the difference is less than the second threshold value.

18. The image processing method according to claim 13, further comprising:
specifying, by an image specifying unit, an image in which one or more persons belonging to the group appear from the image set for each group;

specifying, by a person specifying unit, as specific persons, one or more persons satisfying a predetermined condition among the plurality of persons; and selecting, by an image selecting unit, a part of the images based on whether or not the specific persons appear in an image from among the images in which one or more persons belonging to the group appear for each group.

19. A non-transitory computer-readable recording medium having a program causing a computer to execute the steps of the image processing method according to claim 13 recorded thereon.

* * * * *